United States Patent
Aristides

(10) Patent No.: US 10,762,120 B1
(45) Date of Patent: Sep. 1, 2020

(54) DIGITAL CONTENT COMPILATION

(71) Applicant: Amazon Technologies, Inc., Reno, NV (US)

(72) Inventor: Phivos Costas Aristides, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 698 days.

(21) Appl. No.: 15/091,450

(22) Filed: Apr. 5, 2016

Related U.S. Application Data

(63) Continuation of application No. 13/929,584, filed on Jun. 27, 2013, now Pat. No. 9,361,353.

(51) Int. Cl.
  *G06F 16/435* (2019.01)
  *G06F 16/487* (2019.01)
  *G06F 16/48* (2019.01)

(52) U.S. Cl.
  CPC .......... *G06F 16/435* (2019.01); *G06F 16/487* (2019.01); *G06F 16/489* (2019.01)

(58) Field of Classification Search
  CPC ..... G06F 16/435; G06F 16/489; G06F 16/487
  USPC ........................................................ 707/737
  See application file for complete search history.

(56) References Cited

U.S. PATENT DOCUMENTS

| | | | |
|---|---|---|---|
| 5,657,072 A | 8/1997 | Aristides et al. | |
| 7,024,485 B2* | 4/2006 | Dunning ............... | G06Q 30/02 709/232 |
| 8,150,826 B2* | 4/2012 | Arrouye ............... | G06F 16/11 707/706 |
| 8,595,232 B1 | 11/2013 | Azarm et al. | |
| 9,528,852 B2* | 12/2016 | Eronen ................ | G10L 25/54 |
| 2010/0008639 A1 | 1/2010 | Greenberg et al. | |
| 2010/0082637 A1 | 4/2010 | Mishne et al. | |
| 2011/0060649 A1 | 3/2011 | Dunk et al. | |
| 2011/0082825 A1 | 4/2011 | Sathish et al. | |
| 2011/0238670 A1* | 9/2011 | Mercuri ............ | G06F 17/30867 707/748 |
| 2012/0005209 A1 | 1/2012 | Rinearson et al. | |
| 2012/0109778 A1* | 5/2012 | Chan ..................... | G06Q 30/02 705/26.7 |
| 2012/0110455 A1 | 5/2012 | Sharma et al. | |
| 2012/0192239 A1 | 7/2012 | Harwell et al. | |
| 2012/0197966 A1* | 8/2012 | Wolf ................. | H04N 21/23424 709/203 |
| 2012/0236201 A1* | 9/2012 | Larsen ................... | G06Q 10/10 348/468 |
| 2012/0296908 A1* | 11/2012 | Bach ...................... | G06F 16/68 707/737 |
| 2013/0132392 A1* | 5/2013 | Kenedy ................. | G06Q 30/02 707/737 |
| 2013/0173714 A1 | 7/2013 | D'Amore et al. | |

(Continued)

*Primary Examiner* — Michael Pham
(74) *Attorney, Agent, or Firm* — Lee & Hayes, P.C.

(57) ABSTRACT

Through use of crowd sourced information, media files may be transformed into or used to create product files that are derived from the media files. A product file may be generated using feedback from the crowd sourced information received from an electronic device. The crowd sourced information may indicate one or more portions of the media file to exclude from the product file to create a consolidated product file. In some embodiments, the crowd sourced information may indicate supplemental material and/or portions of other media files that may be included in the product file.

20 Claims, 11 Drawing Sheets

(56) References Cited

U.S. PATENT DOCUMENTS

| | | | |
|---|---|---|---|
| 2013/0231761 A1 | 9/2013 | Eronen et al. | |
| 2013/0268593 A1* | 10/2013 | Parekh | G06Q 50/01 709/204 |
| 2014/0201631 A1* | 7/2014 | Pornprasitsakul | G06F 3/0484 715/716 |
| 2014/0280113 A1 | 9/2014 | Hohwald | |

* cited by examiner

DIGITAL CONTENT COMPILATION

CROSS REFERENCE TO RELATED APPLICATION

This application is a continuation of, and claims priority to, co-pending commonly owned U.S. patent application Ser. No. 13/929,584 entitled, "Crowd Sourced Digital Content Processing" and filed on Jun. 27, 2013, of which the entire contents are incorporated herein by reference.

BACKGROUND

Media player devices enable users to consume digital content in the form of media files (including streamed media) at the convenience of the users. With the proliferation of media files and Internet-based portals for uploading, downloading, and streaming media files, users may obtain not only professionally produced media files, but also media files that are produced by private individuals. In some instances, a user may desire to consume particular portions of a media file that are relevant to a specific subject. In other instances, a user may desire to view or listen to an abridged version of the media file without viewing or listening to the entire media file. In such instances, the user may be forced to hunt for pertinent sections of a media file using user interface control such as fast forward, skip, rewind, and replay. Accordingly, a user may spend a considerable amount of time and effort to find such pertinent sections, which may cause frustration and inconvenience for the user.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
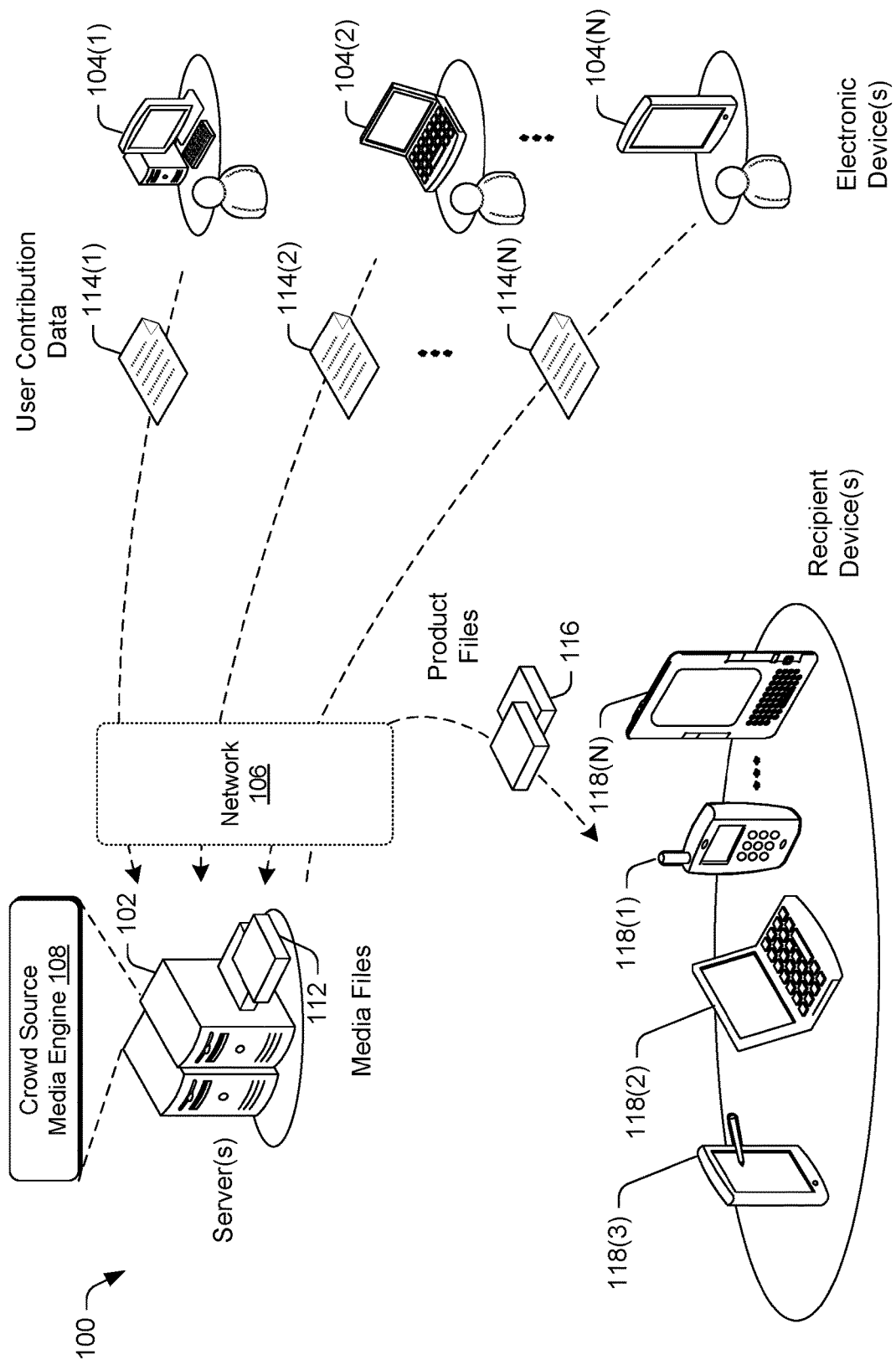
FIG. 1 is a schematic diagram of an illustrative architecture for implementing various embodiments of crowd sourced processing of media files that include digital content.

The disclosure is directed to architectures and techniques for crowd sourcing the processing of media files (including streaming media) that include digital content to create modified media files and compilations files. As described herein, media files may include audio files, video files, and/or multimedia files. The crowd sourced processing of a media file may include the condensing of a media file into a condensed media file. The condensed media file may be a media file that pertains to a particular subject or a media file that highlights particular portions of the original media file. For example, the media file may be a summary of the original media file. In this way, a user that receives the condensed media file may obtain the relevant information while spending less time consuming a media file.

The crowd sourced processing of media files may also include the stitching of sections from multiple media files into a compilation file, such that the compilation file incorporates selected sections of the multiple media files. For example, the newly created compilation file may be tailored according to the explicit or the implicit user characteristics of a recipient user, such that the recipient user finds the compilation file to be particularly relevant to the taste or needs of the recipient user.

The crowd sourced processing of media files may further include the supplementation of the media file or a compilation file with additional relevant content or explanatory material. Such supplementation of a media file may serve to provide a recipient user of the media file with a greater understanding or appreciation of the content described in the media file. Additionally, the crowd sourced processing of media files may also include the stitching of multiple media files that are relevant to an event into a media presentation for the event. The media presentation may enable a recipient user to gain insight and perspective into the event that are otherwise not apparent without the crowd sourced content and the crowd sourced organization of such content.

In various instances, users that contributed to the crowd sourced processing of the media files may receive monetary and/or non-monetary incentives. The value of an incentive that is provided to a contributing user may be dependent on the peer perceived quality or usefulness of the contribution from the contributing user. The non-monetary incentives may be in the form of recognition, such as an increase in user rating on a numerical scale or acknowledgement of contribution in creating particular modified media files or compilation files. The monetary incentive may be a flat fee monetary award, or a percentage monetary award that is based on proceeds from the sale of a modified media file or a compilation file. Other monetary awards may include a gift certificate, a coupon, store credit, or other forms of credits that may be used to offset the cost of purchasing goods or services.

The use of crowd sourced processing of media files may yield modified media files and compilation files that provide users with the ability to acquire pertinent content in reduced amounts of time. Such reduction in amounts of time may enable users to more efficiently gain knowledge, insight, and/or enjoyment from the media files.

FIG. 1 is a schematic diagram of an illustrative environment 100 for implementing various embodiments of crowd sourced processing of media files that include digital content. The computing environment 100 may include a server 102 and a plurality of electronic devices 104(1)-104(N) that are communicatively connected by a network 106. In various embodiments, the electronic devices may include a desktop computer 104(1), a portable computer 104(2), and an electronic book reader device (or, an "eBook reader device") 104(N). Each of the electronic devices 104(1)-104(N) may have software and hardware components that enable the display of video and/or the playback of audio content in various files. However, the recipient devices 104(1)-104(N) are merely examples, and other electronic devices that are equipped with network communication components, data processing components, electronic displays for displaying data, and/or audio output capabilities may be employed.

The network 106 may be a local area network ("LAN"), a larger network such as a wide area network ("WAN"), or a collection of networks, such as the Internet. Protocols for network communication, such as TCP/IP, may be used to implement the network 106. Although embodiments are described herein as using a network such as the Internet, other distribution techniques may be implemented that transmit information via memory cards, flash memory, or other portable memory devices.

A crowd source media engine 108 on the server(s) 102 may use the network 106 to present media files 112 to users at the electronic devices 104(1)-104(N). Each of the electronic devices 104(1)-104(N) may include a web browser that enables a corresponding user to navigate to a web page presented by the crowd source media engine 108. Each web page may present one or more media file for a user to play back. As described herein, media files may include audio files, video files, and/or multimedia files. Accordingly, the play back of a multimedia file may involve the playing of audio tracks and/or video footages.

The web pages may further include user interface controls that enable the users to provide user contributions 114(1)-114(N) with respect to the media files 112. In some instances, the user contribution 114(1) from the electronic device 104(1) may be a user modified version of a media file. For example, the user modified version of an audio file may be a condensed version of the audio file in which irrelevant introductions and/or long pauses between dialogues have been removed using an application user interface on the electronic device 104(1). In other instances, the user contribution 114(2) may be the division of a media file into multiple sections using an application user interface on the electronic device 104(2), such that the sections may be further analyzed by other users. For example, the user of the electronic device 104(2) may use an application user interface to divide a multimedia file that is a lecture into sections according to lecture topics. In this way, additional users may be further crowd sourced into rating the presentation quality of the sections. Based on the ratings assigned to the sections, the crowd source media engine 108 may generate a modified multimedia file that includes sections of the multimedia file with ratings that meet a minimal rating threshold. For example, the multimedia file may include sections for advertisements. Since the ratings for such advertisement sections failed to meet a minimal rating threshold after a predetermined number of votes have been cast by the additional users, the crowd source media engine 108 may remove such advertisement sections to generate a modified multimedia file that does not include these advertisements.

In additional instances, the user contribution 114(N) may be user ratings for sections of multiple related media files. For example, multiple related media files may be multimedia files of a particular lecture that is delivered by a speaker at various times and places around the country. Accordingly, the user contribution 114(N) may be ratings of the sections of the multiple related media files. In such an example, at least some of the sections in one lecture may have corresponding sections in another lecture, as each lecture may cover the same topics and the sections correspond to such topics. As such, the crowd source media engine 108 may combine the user contribution 114(N) with ratings of the sections from other users. Based on the collective ratings from the multiple users, the crowd source media engine 108 may generate a compilation file that includes the highest rated section from each set of corresponding sections.

In further instances, the user contribution from a user may be the filtering or the organization of media files that are related to an event. For example, the media files may be submitted video footages of a car accident that occurred at a particular intersection. The submitted video footages may be taken from different perspectives around the intersection and/or at different times. Accordingly, the user contribution from the user may include the temporal tagging of the video footages in chronological order. Alternatively or concurrently, the user contribution from the user may include the geo-tagging of the video footages according to video shot locations and/or video shot orientations. In this way, the user contribution data submitted by the user may be combined with other data by the crowd source media engine 108. Accordingly, when a sufficient number of geo tags and/or temporal tags submitted are in agreement, the crowd source media engine 108 may use the resulting location, orientation, and/or temporal data for the video footages to generate a stitched media representation of the event. In various embodiments, the generation of the media representation may include temporally overlapping and/or spatially overlapping data from at least some of the multiple media files. The overlapped data may include visual data and/or audio data. For example, the stitched media representation may simultaneously display multiple views of action sequences from the event, such that cause and effect between different occurrences in the event may be understood. Other crowd sourced user contributions from the users may include language translations of specific speech content in the media files, and/or explanatory or supplemental content for topics covered in the media files.

The crowd source media engine 108 may distribute product files 116 to a plurality of recipient devices 118(1)-118(N) for consumption by users. The product files 116 may include modified media files, compilation files, stitched media presentation, and/or other files that are generated by the crowd source media engine 108. In various embodiments, the recipient devices may include a mobile phone 118(1), a portable computer 118(2), a tablet computer 118(3), and an electronic book reader device (or, an "eBook reader device") 118(N).

Each of the recipient devices 118(1)-118(N) may have software and hardware components that enable the display of video and/or the playback of audio from the product files 116. However, the recipient devices 118(1)-118(N) are merely examples, and other electronic devices that are equipped with network communication components, data processing components, electronic displays for displaying data, and/or audio output capabilities may be employed. For example, the recipient devices 118(1)-118(N) may include desktop computers, servers, televisions, set-top boxes, digital media receivers, and other non-portable types of electronic devices.

In some embodiments, the product files 116 that are generated by the crowd source media engine 108 may be tailored to implicit or explicit user characteristics of the users that operate the recipient devices 118(1)-118(N). For example, a media file in the form of an audio file may include sections that contain English dialogue and sections that contain French dialogue. However, since the user of the recipient device 118(1) explicitly indicated that the user does not understand French, a product file that is generated by the crowd source media engine 108 from the media file may include only one or more of the sections that contain English dialogue. In another example, a media file may include two types of sections. One type of sections includes audio discussions of a first topic (e.g., fashion) and the other type of sections includes audio discussion of a second topic (e.g., electronics). In such an example, the crowd source media engine 108 may determine which section to include in the product from the implicit characteristics of the user. The crowd source media engine 108 may infer the implicit characteristics of the user from the purchasing habits of the user at one or more online merchants and/or a prior product file download history of the user. In an instance in which the implicit user characteristics indicate that the user is interested in electronics but not fashion, the crowd source media engine 108 may generate a product file from the media file that includes one or more sections that pertain to electronics, but no section that pertains to fashion.

Figure 2:
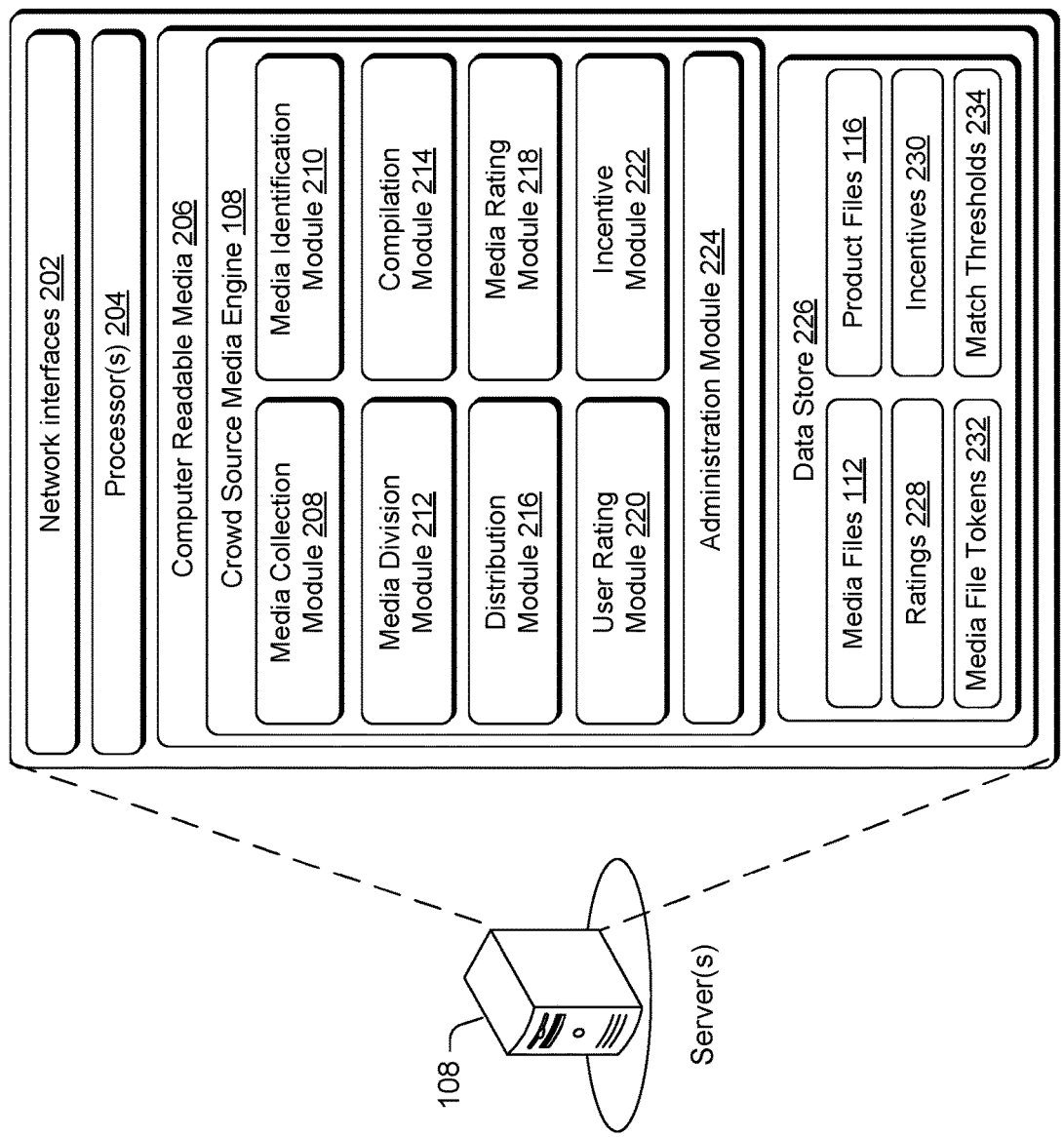
FIG. 2 is a schematic diagram of illustrative components that implement crowd sourced processing of media files that include digital content.

FIG. 2 is a schematic diagram of illustrative components of a crowd source media engine 108 that implement crowd sourced processing of media files. The crowd source media engine 108 may be implemented by the one or more servers 102. The one or more servers 102 may be equipped with network interfaces 202, processor(s) 204, and computer readable media 206. The network interfaces 202 may include wireless and/or wireless communication interface components that enable the servers 102 to transmit and receive data via a network. In various embodiments, the wireless interface component may include, but is not limited to cellular, Wi-Fi, Ultra-wideband (UWB), Bluetooth, satellite transmissions, and/or so forth. The wired interface component may include a direct input/output (I/O) interface, such as an Ethernet interface, a serial interface, a Universal Serial Bus (USB) interface, and/or so forth.

The computer readable media 206 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks.

The crowd source media engine 108 may include a media collection module 208, a media identification module 210, a media division module 212, compilation module 214, a distribution module 216, a media rating module 218, a user rating module 220, an incentive module 222, and an administration module 224. The computer readable media 206 may also implement a data store 226.

The media collection module 208 may receive media files that are submitted from a plurality of electronic devices, such as the electronic devices 104(1)-104(N). The media collection module 208 may store the received media files in the data store 226. The submitted media files may include associated metadata that identify the media files. The metadata information for a media file may include an Internet Protocol (IP) address of the electronic device that transmitted the media file, the name and version of the web browser that is used to submit the media file, and/or other hypertext transfer protocol (HTTP) header information related to the media file.

In some embodiments, the media collection module 208 may extract embedded identification information from the media file. The embedded identification information for a media file may include embedded file identification information (e.g., a globally unique identifier), embedded global positioning system (GPS) coordinate information, embedded time and date information, embedded orientation information from onboard sensors (e.g., compass, gyroscope, accelerometer, etc.), and/or so forth.

The media collection module 208 may collect other information for a media file that is submitted by the user, such as information related to date, time, location, and persons involved with the media file, including identification information (e.g., name and contact information) of the uploading user. For example, when the user uploads a media file that is a recording of a presentation, the user may include information such as a name of the presenter, name of the person that recorded the presentation, a date and/or a time of the presentation, a street address of the presentation, a duration of the presentation, and/or so forth. The media collection module 208 may store the information and metadata that are acquired from the various sources in the data store 226.

The media identification module 210 may identify the media files that are received by the media collection module 208. The identification of a media file may be performed based on the metadata and/or other information that are obtained by the media collection module 208. Once a media file is identified, the media identification module 210 may generate a corresponding identification entry for the media file. In various embodiments, the identification entry may include an internal GUID that is used by the crowd source media engine, as well as other identification information. Such identification information may include date information, time information, location information, orientation information, submitter information, submitter information, and/or so forth.

In some instances, a submitted media file may include little or no associated information that helps to identify the media file. In such instances, the media identification module 210 may use machine learning to identify the media file. In at least one embodiment, the media identification module 210 may use a speech-to-text algorithm to extract words from the audio track of the media file. Subsequently, the media identification module 210 may tokenize words into part of speech tokens, e.g., nouns, verbs, adjectives, etc. The media identification module 210 may compare the tokens that resulted from the unknown media file with tokens that are extracted from other known media files. Accordingly, when a token match rate between the tokens from the unknown media file and the tokens from a known media file reaches a predetermined match threshold, the media identification module 210 may assign the identification information from the known media file to the unknown media file. In this way, the media identification module 210 may identify media files that are submitted without associated identification information.

The match threshold that is used for the media file may be dependent on the category of the media file. For example, the category may be a subject matter category, an importance category, a source category, or so forth. The media file may be classified into an important category based on a level of importance that is assigned to the media file (e.g., importance levels 1-5). The media file may be assigned to a source category based on the origin of the media file. For example, media files produced by professionals may be placed in a category with a higher or lower match threshold than a category for media files uploaded by amateurs. The match threshold for the categories may be stored as a list in the data store 226 for access by the media identification module 210.

In additional embodiments, the media identification module 210 may also take into account one or more additional pieces of information that are associated with an unknown media file, in conjunction with the token match threshold, to assign identification information to the unknown media file. Such additional information may be embedded or collected metadata. For example, the unknown media file may include GPS coordinates of the location at which the media file was created. Thus, the media identification module 210 may assign identification information when the token matching reaches a matching threshold and the GPS coordinates associated with the unknown media file is within a predetermined proximity of the GPS coordinates associated with the known media file. In another example, a token matching rate may be used with the submission IP addresses of the known and unknown media files (e.g., IP addresses indicates that the two media files are submitted from a particular geographic region) to determine that identification information is to be assigned to the unknown media file.

The machine learning used by the media identification module 210 may alternatively or concurrently involved the use of an image recognition algorithm. For example, an image recognition algorithm may be used to compare the objects that are depicted in the shots from an unknown media file and a known media file. The objects may be faces of people, images of buildings, and/or other features that are captured in the media files. Accordingly, when a sufficient number of shots from both the unknown media file and the known media file are determined to depict the same feature, the media identification module 210 may assign the identification information from the known media file to the unknown media file. However, in other instances, image correlation may be used in conjunction with speech correlation and/or correlation based on one or more additional pieces of information to identify unknown media files for the purpose of assigning identification information to the unknown media files.

In other instances, the media identification module 210 may leverage crowd sourcing to identify unknown media files. In such instances, the media identification module 210 may present an unknown media file to users at multiple electronic devices. For example, the media identification module 210 may post the unknown media file on a web page that is accessible to the users of the multiple electronic devices 104(1)-104(N). Accordingly, when a threshold percentage of a total number of users (e.g., 30 out of 40 users) identify the unknown media file as being a particular media file, the media identification module 210 may associate the corresponding identification information with the unknown media file. In some instances, the media identification module 210 may leverage crowd sourcing to identify unknown media files that are not identifiable via machine learning and/or from embedded data.

Alternatively, the media identification module 210 may also apply crowd sourcing for media file event tagging. For example, the media identification module 210 may present media files so that users may provide temporal tagging or geo-tagging information for the media files. In some instances, once the media identification module 210 has assigned identification information to a media file, the media identification module 210 may group the identified media file with the known media file.

The media identification module 210 may serve to group similar media files into a group. In various embodiments, the media identification module 210 may use the identification information of the media files to correlate the media files. For example, if the metadata of two media files indicate that the media files are multimedia recordings of a particular presentation that is given by a lecturer, the media identification module 210 may group them together as being related. In additional embodiments, the media identification module 210 may use an image recognition algorithm to group media files. For example, the image recognition algorithm may indicate that two media files depict one or more common objects and/or persons. As such, when the two media files depict the one or more common objects and/or persons for a predetermined amount of time (e.g., a fixed time interval or a percentage of the overall temporal length of the media files), the media identification module 210 may group the two media files into a corresponding group. In alternative embodiments, the media identification module 210 may cause the multiple media files to be displayed on the electronic devices of multiple users. In this way, the media identification module 210 may leverage crowd sourcing to group the media files.

The media division module 212 may divide media files into sections based on machine learning or crowd sourcing. The division of a media file using machine learning may employ an audio discontinuity recognition algorithm or a visual discontinuity recognition algorithm. For example, the audio discontinuity recognition algorithm may monitor the spoken words that are in a media file in the form of an audio recording. Accordingly, when the audio discontinuity algorithm detects that the spoken words transitions from being related to a first topic to being related to a second topic, the media division module 212 may divide the media file into sections at that transition point. In other instances, the audio discontinuity algorithm may alternatively or concurrently use other audio clues to divide a media file into sections. Such audio clues may include changes in the persons speaking that are detected through voice recognition, the absence or presence of background noise (e.g., static, music, ambient noise, etc.), changes in the audio channel that is picking up audio, and/or so forth.

The media division module 212 may use the visual discontinuity recognition algorithm to detect scene transitions in a media file that include video. The scene transitions may be detected through changes in lighting, changes in background objects, changes in foreground objects, change in field of view, and/or so forth. Accordingly, when the visual discontinuity recognition algorithm detects a scene transition, the media division module 212 may divide the media file into sections at the scene transition.

In other embodiments, the media division module 212 may leverage crowd sourcing to divide a media file into sections. In such embodiments, the media division module 212 may present the media file to users at multiple electronic devices. For example, the media division module 212 may post the unknown media file on a web page that is accessible to the users of the multiple devices. Accordingly, the media division module 212 may divide a media file into sections at a particular point when a threshold percentage of a total number of users (e.g., 30 out of 40 users) identifies the particular point as a transition point. In this way, the media division module 212 may leverage crowd sourcing to split a media file into multiple sections. In some embodiments, the media division module 212 may leverage the metadata that are embedded within a media file to divide a media file into section. For example, the metadata may indicate the time length of each section in a media file and/or the start time and end time of each section. In this way, the media division module 212 may break the media file into sections according to the embedded metadata.

In additional embodiments, the media division module 212 may also correlate sections from multiple media files into sets of corresponding sections. Each set of corresponding sections may have one or more similarity characteristics in common. For example, a set of corresponding sections may pertain to a common topic, relate to a common event, and/or depict the same objects or persons. In such embodiments, the media division module 212 may use various techniques to determine similarities between sections for grouping the sections. For instance, the media division module 212 may rely on the metadata that are embedded in the multiple media files when the metadata indicates common traits of the sections. In other instances the media division module 212 may use the comparison of tokens that are generated from the spoken words in the sections of the media files. Thus, similar to the media identification module 210, the media division module 212 may determine that two sections correspond to each other when a token matching rate between the sections meets a matching threshold. In additional instances, the media division module 212 may use an image recognition algorithm to group sections into sets of corresponding sections. For example, the image recognition algorithm may indicate that two sections from different media files depict one or more common objects and/or persons. As such, when the two sections depict the one or more common objects and/or persons for a predetermined amount of time (e.g., a fixed time interval or a percentage of the overall temporal length of the sections), the media division module 212 may group the two sections into a corresponding set. In alternative embodiments, the media division module 212 may cause the sections of the multiple media files to be displayed on the electronic devices of multiple users. In this way, the media division module 212 may leverage crowd sourcing to group sections into sets of corresponding sections.

The compilation module 214 may present identified media files to users, such that the users may provide contribution data regarding the media files. The contribution data may be used by the crowd source media engine 108 to generated condensed media files and compilation files.

In some instances, the compilation module 214 may present a media file to an electronic device of a user via a web page. The web page may include a user interface that enables the user to select one or more portions of the media file to retain and one or more portions of the media file to delete. For example, a media file that is an audio recording of a meeting may include long pauses between dialogues. Accordingly, the user may manipulate the user interface controls to mark the long pauses for deletion. The compilation module 214 may receive the user manipulations of the media file as contribution data. Subsequently, the compilation module 214 may modify the media file according to the contribution data to generate a modified media file. In additional instances, the user may use the user interface controls to remove portions of a media file that contains content that may be boring, irrelevant, offensive, or have low value to the user, or retain other content that may be of particular importance or interest to generate a summary of the media file.

In other instances, the compilation module 214 may present a media file to the electronic device of a user via a web page. The web page may include user interface controls that enable the user to submit ratings for sections of the media file. Each rating may be a numerical rating that is based on a fixed scale (e.g., 3 out of 5 stars). The compilation module 214 may collect such ratings from a predetermined number of users. Subsequently, the compilation module 214 may generate a compilation file that includes one or more sections of the media file, in which each section has an average rating from the predetermined users that exceed a predetermined rating threshold (e.g., at least 3 out of 5 stars). The compilation module 214 may subsequently repeat the generation of the compilation file after another predetermined number of users (e.g., 10 users) have submitted user ratings, and so forth.

In other embodiments, the compilation module 214 may receive binary votes for each section of a media file. In other words, a user may either vote to keep a section or remove the section from the media file. Accordingly, after a predetermined number of users have submitted votes for a section, the compilation module 214 may tally up the votes for a section. If a majority of the users voted to keep the section in the media file, then the compilation module 214 may retain the section in the resultant compilation file. Conversely, if a majority of the users voted to remove the section from the media file, then the compilation module 214 may remove the section from the resultant compilation file. The compilation module 214 may subsequently repeat the generation of the modified file after another predetermined number of users (e.g., 10 users) have submitted their votes, and so forth.

In additional instances, the compilation module 214 may present multiple related media files to the electronic device of the user via a web page. The web page may include user interface controls that enable the user to rate sections of the multiple related media files. In one instance, the user may be presented with multiple related media files that are divided into sections by the media division module 212. Some the sections from the different related media files may correlate with each other. For example, the sections may be discussions of a particular topic from two presentations of the same lecture. In such an instance, the user may be prompted to assign a rating to each section of the multiple related media files. The rating may be a numerical rating that is based on a fixed scale (e.g., 3 out 5 stars). The compilation module 214 may collect such ratings from a predetermined number of users. Subsequently, the compilation module 214 may generate a compilation file that includes sections from the multiple media files that have the highest ratings, as provided by the predetermined number of users. The compilation module 214 may subsequently repeat the generation of a compilation file after another predetermined number of users (e.g., 10 users) have submitted user ratings, and so forth. Alternatively, the compilation module 214 may collect votes on which section from each set of correlated sections to keep in the compilation file. Accordingly, the compilation module 214 may keep a section from a set of correlated sections for inclusion in a compilation file when the section receives a majority of the votes, and the remaining sections of the set of correlated sections are discarded. The compilation module 214 may perform such a task for all the sets of correlated sections of the multiple media files. Further, the compilation module 214 may subsequently repeat the generation of the compilation file after another predetermined number of users (e.g., 10 users) have submitted their votes, and so forth.

In some embodiments, the compilation module 214 may enable users to submit other forms of contribution data with respect to the media files. The contribution data may include language translations for spoken words in a media file. For example, a user may notice that the spoken words in a particular section of a media file are in a first language while the spoken words in the remaining sections of the media file are in a second language. In such an instance, the user may use a text input box on a user interface page provided by the compilation module 214 to enter translation of the spoken words in the particular section from the first language to the second language. Alternatively or concurrently, the contribution data may include explanatory material for content in the sections of a media file. For example, a user may notice that a particular acronym or abbreviation (e.g., SoDo) that is used in a section of a media file may be difficult to understand for a person that is not familiar with the content of the media file. Thus, the user may use a text input box on a user interface page provided by the compilation module 214 to enter an explanation for the particular acronym or abbreviation (e.g., SoDo represents South of Downtown). Similarly, users may also provide explanations for concepts or ideas that are discussed in a media file. In another example in which the media file is an audio file, the explanatory material that is contributed may include explanation of the context of the audio descriptions in the audio file. For instance, the audio file may be of a lecture in which the presenter is explaining a subject matter using visual aids. However, since the media file is an audio file that without any visual content, the references of the presenter to the visual aids may be unclear. In such an instance, a user with knowledge of the particular visual aid being discussed and the content of such a visual aid may provide an explanation. Such explanation may be presented as text descriptions, picture in picture video clips, voiceovers that are integrated with the audio file, and/or other forms of insertions. Alternatively or concurrently, the contribution data submitted with respect to media files may be in the form of content modification, such as replacing offensive content (e.g., visually disturbing images or profanities) in a section of the media file with silence, tones, or substitute content (a blank frame, a non-offensive image or speech, etc.). In still other embodiments, the contribution data submitted with respect to the media files may be in the form of metadata flags that mark locations offensive content in the sections of the media files and/or metadata flags that provide content ratings for the sections of the media files. For instance, the content ratings may be based on rating system that rates the sections for age appropriateness (e.g., G, PG, PG-13, R, etc.).

In such embodiments, the compilation module 214 may use a user profile of a user to determine whether a modified media file or a compilation file is to be provided with the supplemental material during generation. The user profile of the user may include the implicit or explicit characteristics the user, such as demographic information that is obtained based on the purchases made by the user at one or more online merchants. For example, if the compilation module 214 determines from the user profile of a user that the user does not speak a particular language that is used in a section of a media file, the compilation module 214 may insert text translation of the content in the section to the media file. In another example, if the compilation module 214 determines from the user profile of the user that the user is unlikely to be familiar with the content of a compilation file, the compilation module 214 may supplement the compilation file with explanatory material during the generation of the compilation file.

The compilation module 214 may also take into consideration the implicit and explicit user characteristics of a user to tailor a generated compilation file to the user. For example, a media file in the form of an audio file that includes sections that contain English dialogue and sections that contain French dialogue. However, since the user of the recipient device 118(1) explicitly indicated that the user does not understand French, the compilation module 214 may generate a compilation file that includes only one or more of the sections that contain English dialogue. In another example, a media file may include two types of sections. One type of sections includes audio discussions of a first topic (e.g., fashion) and the other type of sections includes audio discussion of a second topic (e.g., electronics). In such an example, the compilation module 214 may determine from the purchasing habits of the user at one or more online merchants and/or a prior product file download history of the user that the user is interested in electronics but not fashion. Accordingly, the compilation module 214 may generate a product file from the media file that includes one or more sections pertaining to electronics, but no section that pertains to fashion. The compilation module 214 may also obtain user interests in topics and subjects from mining social media pages or web blog postings of the user. For example, a user may provide to the compilation module 214 identification information of the user at a social media website. In turn, the compilation module 214 may mine the web page of the user at the social media website for words or phrases that are indicative of the user's interest.

While the compilation module 214 is described as being capable of generating compilation files based on user inputted ratings for sections of media content, the compilation module 214 is also capable of leveraging crowd sourced user behavior to generate compilation files. In various embodiments, the compilation module 214 may be capable of monitoring user consumption behaviors as users view and/or listen to media files on electronic devices, such as the electronic devices 104(1)-104(N). For example, a content presentation application on an electronic device may be configured to monitor and report user consumption behaviors to the compilation module 214 via the network 106. In such embodiments, the compilation module 214 may interpret behavior such as skipping or fast forwarding through content in a section of a media file as a negative rating for the section (e.g., exclude the section). Conversely, the compilation module 214 may interpret behavior such as playing a section at normal or slowed speed, replaying the section, or skipping back to the section as a positive rating for the section (e.g. retain the section). The compilation module 214 may collect such negative and positive ratings as users consume a media file on multiple devices. Accordingly, the compilation module 214 may cut out a particular section to generate a compilation file when a ratio between negative ratings and positive ratings for the particular section reach a predetermined ratio threshold (e.g., 10:1. 5:1, 2:1, etc.). However, in some instances, user behavior such as replaying or skipping back to a section of a media file may not indicate that a user has a positive impression of the section. Another reason for such behavior may be poor sound and/or visual quality that makes the content of the section difficult to discern. Accordingly, in at least one embodiment, the compilation module 214 may use an audio quality and/or image quality assessment algorithm to determine that the replayed or skipped back section meets a predetermined quality threshold before determining that the replay or skip back behavior by a consumer is a positive rating. Alternatively or concurrently, in instances in which metadata flags provide content ratings or sections of media files, the compilation module 214 may generate product files based on an explicit user content rating selection for product file compilation. For example, in one instance, the compilation module 214 may generate a product file that includes sections that are appropriate for viewing by children (e.g., G-rated sections). However, in another instance, the compilation module 214 may generate another product file that includes sections that are appropriate for viewing by both children and adults (e.g., both G-rated and R-rated sections).

The compilation module 214 may generate media representations of events from multiple media files. The compilation module 214 may collect geo tags and/or temporal tags for media files that are associated with an event. Accordingly, when a predetermined number or percentage of geo tags and/or temporal tags collected for each media file are in agreement, the compilation module 214 may use the resulting location, orientation, and/or temporal data collected for the media files to generate a stitched media representation of the event. In some instances, the compilation module 214 may use the metadata flags that mark the locations of offensive content in the media files, such that the compilation module 214 may block the offensive content (e.g., visually disturbing images or profanities) in a media file from being presented with silence, tones, or substitute content (a blank frame, a non-offensive image or speech, etc.). Further, in still other embodiments, the compilation module 214 may generate stitched media representations of an event according to content ratings for sections in the media files that are associated with the event. In such embodiments, a user may provide a content rating selection as a criterion for assembling a stitched media representation, and the compilation module 214 may assemble the stitched media representation of the event from one or more sections of media files that fit the content rating selection.

The distribution module 216 may distribute the product files 116 to recipient devices, such as the recipient device 118(1)-118(N). The product files 116 may include modified media files and compilation files that are generated by the compilation module 214. In various embodiments, the distribution module 216 may distribute a product file to a recipient device via the network 106 upon receiving a request originating from the recipient device. In some embodiments, the distribution module 216 may provide a product file to the recipient device of a user in exchange for a monetary payment. For example, the distribution module 216 may charge a fixed amount (e.g., ten cents) for providing a copy of a particular modified media file.

The media rating module 218 may enable users to submit ratings for the product files 116 that are generated by the compilation module 214. Each rating may be a numerical rating that is based on a fixed scale (e.g., 3 out of 5 stars). Accordingly, the media rating module 218 may average the ratings that are received for a product file over time to calculate an ongoing rating for the product file. In some instances, the ratings received for the modified media files that are generated from the same media file may determine which version of the modified media file may be delivered to recipient devices. In such instances, the media rating module 218 may select a predetermined number of highest rated modified media files for distribution to the recipient device upon request.

In other instances, the ratings that are received for the product files 116 may impact the ratings of the users that contributed to the generation of the product files 116. For example, the rating of a user that submitted a modified media file may correlate to or is impacted by the rating that is awarded by one or more reviewers to the modified media file. The ratings of the product files 116 may also be used to determine incentives that are awarded to the users that contributed to the generation of the product files 116.

The user rating module 220 may calculate the user ratings for the users that contributed to the generation of the product files 116. Each rating may be a numerical rating that is based on a fixed scale (e.g., 3 out of 5 stars). In some embodiments, the user rating module 220 may generate a rating for a user by averaging the ratings of the multiple modified media files produced by the user. For example, if a user produced a first modified media file that received an average rating of 4 stars, and produced a second modified media file that received an average rating of 3 stars, then the rating of the user may be 3.5 stars. In other embodiments, the rating of the user may be based on a percentage of times that the ratings assigned by the user to sections of media files agree with average ratings assigned to the sections by multiple users. For example, a user may assign a rating of 4 stars to a section, and the averages of ratings for the section by a number of other users (e.g., 20 users) may also be 4 stars. In such an instance, the rating assign by the user to the section may be deemed by the user rating module 220 to be in agreement with the average rating for the section. In other examples, the user rating for a section may also deemed to be in agreement with the average rating for the section when the user rating is within a predetermined deviation (e.g., five percent, ten percent, etc.) of the average rating for the section. In instances in which the compilation module 214 is configured to take binary votes, the user rating module 220 may count as a rating agreement when a user vote to keep or remove a section conforms to a majority of the votes that ultimately resulted in the section being kept in or removed from a compilation file.

Accordingly, the user rating module 220 may calculate a user rating for the user based on the percentage of rating agreements. For example, 90% rating agreement and above may produce a rating of 5 stars, 80% rating agreement and above may product a rating of 4 stars, 70% rating agreement and above may produce a rating of 3 stars, and so on and so forth. In instances in which a user produces both modified media files and also rates sections of other media files, the user rating module 220 may calculate a rating for the user by averaging the user ratings that are derived from participation in the generation of one or more modified media files and derived from participation in the ratings of media file sections. However, other embodiments may include the assignment of weights to the user ratings from the different participations prior to averaging. Such weighting may be designed to emphasis rating for one form of participation over another form of participation. In this way, the rating of a user may be calculated from the quality of the product files that are generated from the participation of the user.

In other embodiments, the user rating module 220 may enable users to directly input user ratings for the users that contributed to the generation of the product files 116. Once again, each rating may be a numerical rating that is based on a fixed scale (e.g., 3 out of 5 stars). In at least one embodiment, the user rating module 220 may average a directly inputted user rating for a user with one or more calculated ratings for the user, in which the weighting may be performed before the averaging to emphasis one or more of the elemental user ratings that are used to derive the final user rating.

The incentive module 222 may provide incentives to users that contribute to the generation of the product files 116. The incentive may be non-monetary. For example, the incentive module 222 may display attribution information (e.g., name, contact information, etc.) when the user contributed to the generation of the product file and the rating of the user is above a predetermined rating threshold after a predetermined number of contribution submissions. The incentive module 222 may also grant a user with a user rating that is above a rating threshold with additional privileges or recognition. For example, the incentive module 222 may provide the user with invitations to contribute to the generation of product files from high value media files. Such high value media files may be files that deal with complex, technical, and/or specialized topics. In another example, the incentive module 222 may assign special status labels to the user based on the number of user ratings received by the user that are above one or more particular rating thresholds (e.g., elite reviewer, power reviewer, exceptional reviewer, and/or so forth). The rating threshold may be a fixed threshold (e.g., at least 4 of 5 stars) or a relative threshold, such as rating threshold that excludes a predetermined percentage of the lowest rated users (e.g., 90 percentile or above are provide with incentives).

In other embodiments, the incentive module 222 may provide monetary incentives. In some instances, when the rating of a user exceeds a particular fixed or relative rating threshold after a predetermined number of contribution submissions, the user may be awarded a percentage of the profit that is derived from the sale of a modified media file generated by the user. In other instances in which multiple users contributed ratings of sections that resulted in the compilation module 214 generating a compilation file, each user may receive some compensation for contributing media file or section rating information. Such compensation may be in the form of a coupon, a discount offer, points that are redeemable for merchandise, and/or some other form of credit that has some monetary value.

The administration module 224 may enable an administrator to monitor the performance of the crowd source media engine 108. In various embodiments, the administrator may interact with the administration module 224 through user interfaces. The user interfaces may include, but are not limited to, combinations of one or more of keypads, keyboards, mouse devices, touch screens, microphones, speech recognition packages, and any other suitable devices or other electronic/software selection components. Further, the user interfaces may also provide data to the user via a display. In some instances, the administrator may use the administration module 224 to review the product files 116 before the distribution of the product files 116 to the recipient devices 118(1)-118(N).

For example, the administrator may review for product files that are offensive or distort the original content of the media files, such that certain product files may be removed from distribution. The administration module 224 may also enable the administrator to prevent specific users from contributing to the generation of product files, or revoke the privilege of specific recipients in obtaining copies of the product files 116.

The data store 226 may store the various data that are used by the modules of the crowd source media engine 108. The data may be in the form of metadata that may be manipulated and/or distributed by the modules of the crowd source media engine 108. In various embodiments, the data store may store the media files 112, the product files 116, the identification information for the media files 112, and the supplemental information provided for the media files 112. In some embodiments, the product files 116 that are generated may be used by the media collection module 208 as source media files, such that additional product files may be generated from the one or more products files 116 by the crowd source media engine 108. Such generation may be based solely on the one or more product files 116, or based on a combination of the one or more product files 116 with one or more other media files.

In some instances, the product files 116 that are generated by the compilation module 214 may include entirely metadata or at least some metadata, rather may being made up entirely of sections from one or more media files. In various embodiments, the metadata may indicate the chronological order of the multiple sections and/or locations of the multiple sections (e.g., a hyperlink, a file directory path, etc.). For example, a section of a product file may be located on one of the servers 102, while another section may be located on an entirely different server. The other server may be a server that is operated by the same organization or a different organization. Accordingly, the distribution module 216 may perform a distribution of a product file to a recipient device by providing the relevant metadata to the recipient device, either alone or in combination with one or more other media file sections. In this way, the recipient device may generate the product file on-the-fly partially or entirely from the distributed metadata. For example, the metadata that is distributed by the distribution module 216 may instruct a recipient device to pull a section that is in a first language (e.g., English) from a first server and a section that is in a second language (e.g., French) from a second server to assemble into a product file.

The data store 226 may further store the various ratings 228 that are generated by the media rating module 218 and the user rating module 220, as well as incentives 230 that are awarded to the users. The data store 226 may further store tokens that are generated from the spoken words in the media files.

The modules of the crowd source media engine 108 are described above as using web pages to display media files and product files to users and receive contribution data from the users. However, the modules may also be configured to use dedicated applications that are installed on the electronic devices 104(1)-104(N) to achieve the same purpose. For example, such dedicated application may render user interface pages on the electronic devices 104(1)-104(N) under direction from the modules of the crowd source media engine 108.

Figure 3:
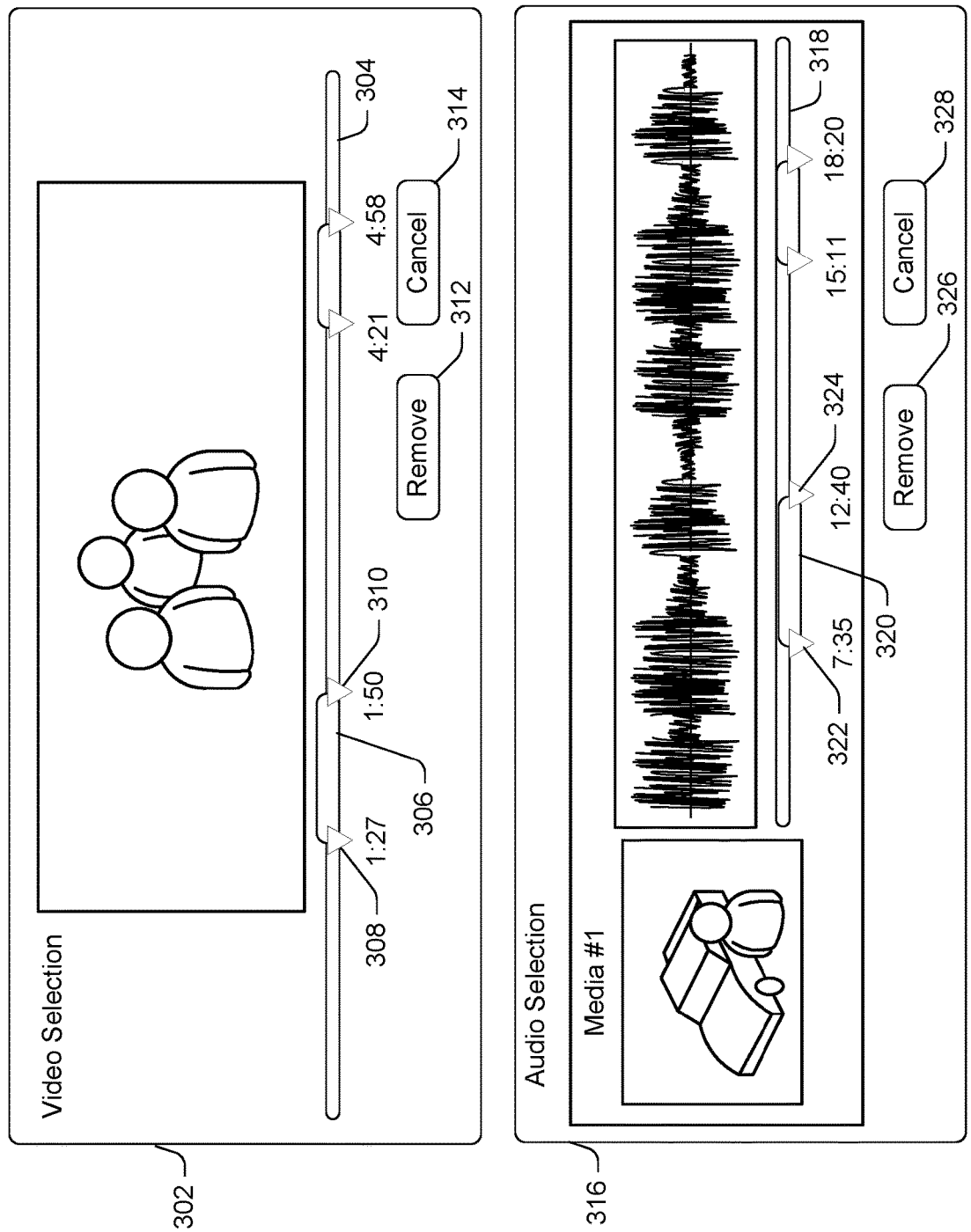
FIG. 3 is a block diagram that illustrates example user interfaces for crowd sourcing the creation of modified media files from existing media files that include digital content.

FIG. 3 is a block diagram that illustrates example user interfaces for crowd source the creation of modified media files from existing media files that include digital content. The user interfaces may be generated by the compilation module 214. The user interface 302 may enable users to modify a media file based on the video footage contained in the media file. In various embodiments, a selection control 304 of the user interface 302 may include content selection tools, such as the content selection tool 306. Each of the content selection tools may enable a user to select portions of the media file to be removed by designating a start and an end of the section to be removed. For example, the content selection tool 306 may include a start marker 308 and an end marker 310. The start marker 308 may be manipulated to designate the start of a section to be removed, and the end marker 310 may be manipulated to designate the end of the section to be removed. In such an example, once the user has adjusted the start marker 308 and the end marker 310, the user may activate the remove button 312 to designate the marked section for removal. In this way, the user may use one or more content selection tools to designate corresponding sections to be removed. The activation of the cancel button 314 may enable the user to undo one or more selections of sections for removal.

In alternative embodiments, the content selection tools of the selection control 304 may be used to select sections of the media file to keep rather than sections of media files to be removed. In such embodiments, the remove button 312 may be replaced with a keep button. The user may use the keep button to designate sections of the media file that are to be retained, so that the remaining sections may be removed to form a modified media file.

The user interface 316 may enable users to modify a media file based on the audio track contained in the media file. In various embodiments, a selection control 318 of the user interface 316 may include content selection tools, such as the content selection tool 320. Each of the content selection tools may enable a user to select portions of the media file to be removed by designating a start and an end of the section to be removed. For example, the content selection tool 320 may include a start marker 322 and an end marker 324. The start marker 322 may be manipulated to designate the start of a section to be removed, and the end marker 324 may be manipulated to designate the end of the section to be removed. In such an example, once the user has adjusted the start marker 322 and the end marker 324, the user may activate the remove button 326 to designate the marked section for removal. In this way, the user may use one or more content selection tools to designate corresponding sections to be removed. The activation of the cancel button 328 may enable the user to undo one or more selections of sections for removal.

In alternative embodiments, the content selection tools of the selection control 318 may be used to select sections of the media file to keep rather than sections of media files to be removed. In such embodiments, the remove button 326 may be replaced with a keep button. The user may use the keep button to designate sections of the media file that are to be retained, so that the remaining sections may be removed to form a modified media file.

In some embodiments, the compilation module 214 may join the sections that are selected for a product file using fading in and/or fade out effects, such that there is better perceived continuity between the joined sections. Such effects may be directly added to the product file by the compilation module 214, or the compilation module 214 may encode metadata that causes the insertion of such effects into the product file by another application.

Figure 4:
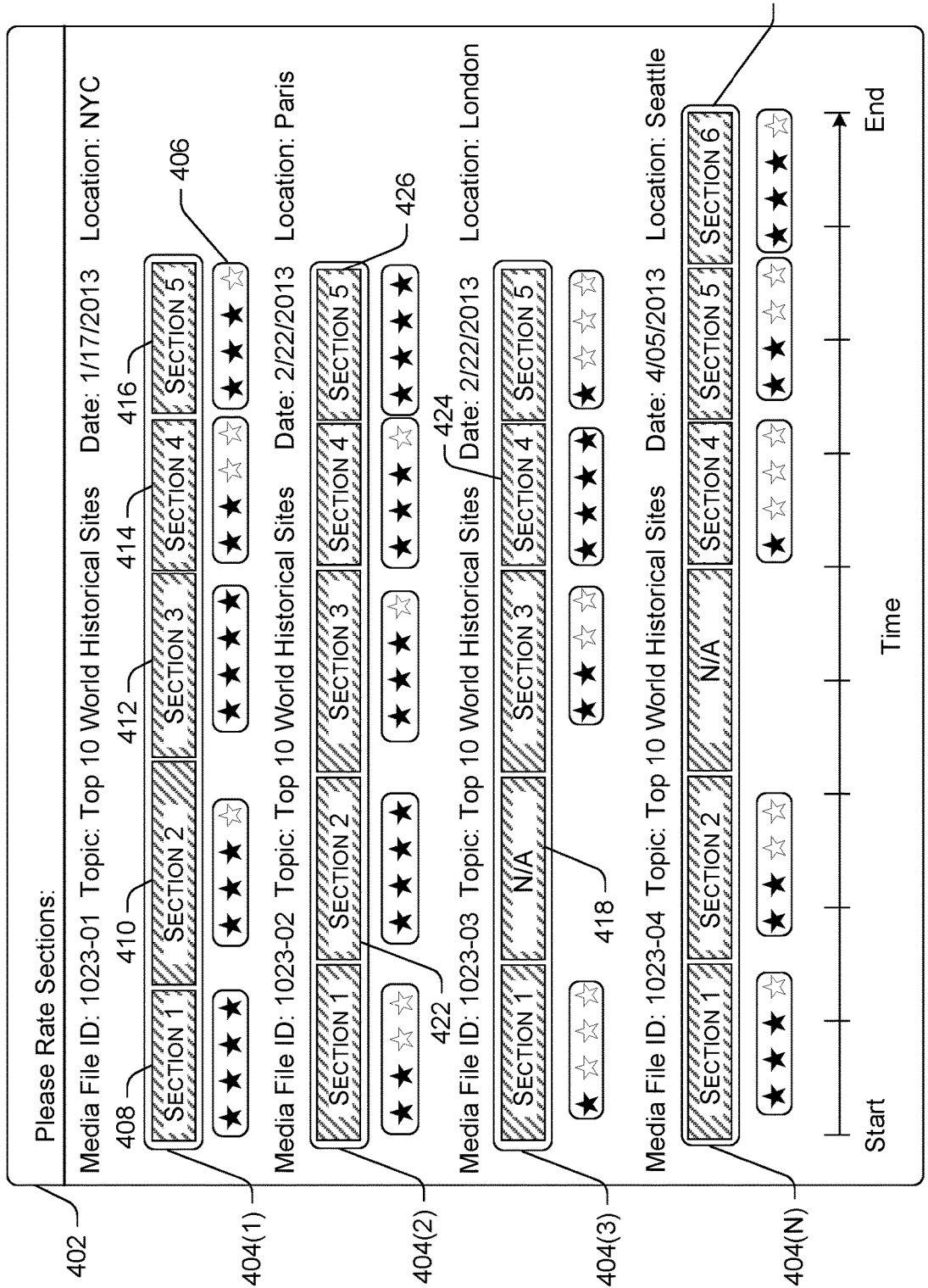
FIG. 4 is a block diagram that illustrates an example user interface for crowd sourcing the creation of compilation files from exiting media files.

FIG. 4 is a block diagram that illustrates an example user interface 402 for crowd sourcing the creation of compilation files from exiting media files. The user interface 402 may be generated by the compilation module 214. The user interface 402 may enable a user to rate the sections of the multiple media files, such that the compilation module 214 may generate a compilation file from the multiple media files. The user interface 402 may display a set of representations 404(1)-404(N) that show media files that are determined to be related by the media identification module 210. Each representation shows the graphical depictions of the sections of a corresponding media file. Further, each representation may be displayed with the relevant media identification information, such as a file identifier, a media file title, date of creation, and/or so forth. In various embodiments, the user may select a graphical depiction to activate a media display window. The media display window may play back audio content, video content, or multimedia content. Thus, once a user has viewed the content of a section, the user may assign a rating to a section. The user may assign a rating to each section using a corresponding rating assignment control, such as the rating assignment control 406. Although the rating assignment controls are depicted as controls that enable a user to input the number of stars, the rating assignment controls may enable the input of other forms of rating data. For example, such rating data may include numerical values, points, etc. However, the rating data that are entered for the sections of the media files using the same rating scale.

For example, as shown in FIG. 4, the user may assign a four star rating to a section 408 of the media file 404(1), a three star rating to section 410, a four star rating to the section 412, a two star rating to section 414, and a three star rating to section 416. In this way, a user may rate each section of the media files. However, in some instances, a media file may be missing a section that is present in the remaining related media files. For example, the media file 404(3) may be missing a section as a corresponding topic was skipped over in a particular presentation of the lecture. Accordingly, the user interface 402 may only provide a placeholder depiction 418 of the missing section, but no corresponding rating assignment control. In other instances, a media file may include a section that is not present in the remaining related media files. For example, the media file 404(N) may include a section 420 that is not present in the other media files because the section pertains to a question answer session that did not occur in the other presentations of the lecture.

As described above, the compilation module 214 may select a highest rated section from each group of corresponding sections to generate a compilation file. For example, assume that the compilation module 214 has to create a compilation file based on the ratings as shown in FIG. 4, the compilation module 214 may select the section 408 of the media file 404(1) as "section 1" of the compilation file. Furthermore, the compilation module 214 may select section 422 of the media file 404(3) as "section 2" of the compilation file and select section 412 of the media file 404(1) as "section 3" of the compilation file. Additionally, the compilation module 214 may also select section 424 of the media file 404(3) as section "4" of the compilation file, section 426 of the media file 404(2) as "section 5" of the compilation file, and section 428 of the media file 404(N) as section 6" of the compilation file. The compilation module 214 may select section 428 to include in the compilation file because section 428 has no corresponding sections in the other media files.

In some embodiment, rather than rating assignment controls, the user interface 402 may provide voting buttons. The voting buttons may enable a user to vote to keep one section from each set of correlated sections of the media files 404(1)-404(N). In other words, users are expected to select what they consider to be the best "section 1", the best "section 2", and so on and so forth for inclusion in the final compilation file.

FIGS. 5-11 show illustrative processes 500-1100 that implement crowd sourced processing of media files. Each of the processes 500-1100 is illustrated as a collection of steps in a logical flow diagram, which represents a sequence of operations that can be implemented in hardware, software, or a combination thereof. In the context of software, the steps represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, the processes 500-1100 are described with reference to the environment 100 of FIG. 1.

Figure 5:
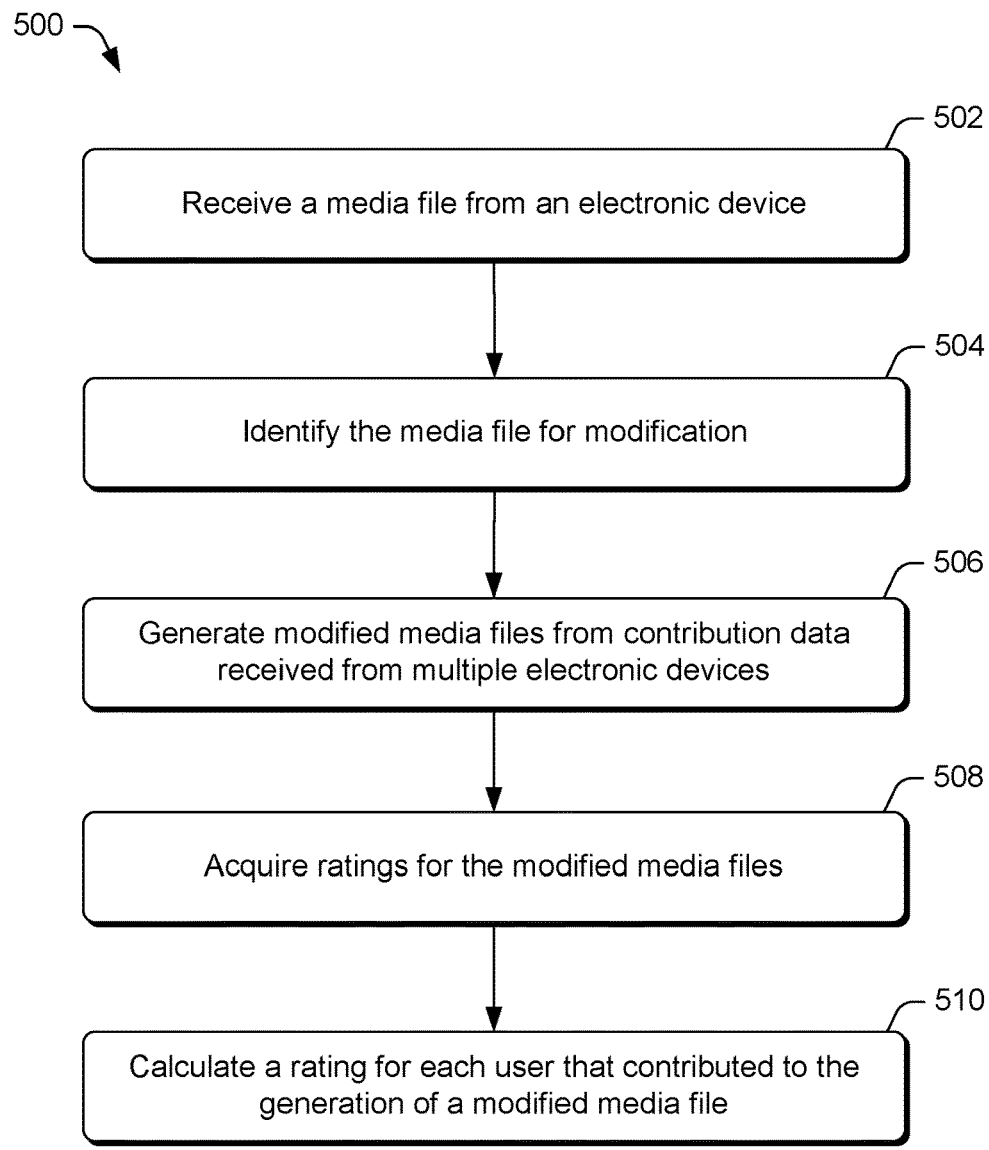
FIG. 5 is a flow diagram of an illustrative process for crowd sourcing modified media files for multiple users and distributing the modified media files.

FIG. 5 is a flow diagram of an illustrative process 500 for crowd sourcing modified media files for multiple users and distributing the modified media files. At block 502, the crowd source media engine 108 may receive a media file from an electronic device, such as the electronic device 104(1). In various embodiments, the crowd source media engine 108 may receive the media file in response to broadcasting a request for media files that are related to a topic to multiple electronic devices. The media file may be transmitted to the crowd source media engine 108 via the network 106.

At block 504, the crowd source media engine 108 may identify the media file for modification. The media file may be identified using at least one of metadata embedded in the media file, machine learning based classification, or crowd sourced classification information. In some embodiments, the modification may involve the removal of dead space (e.g., long pauses) from the media file, the removal of non-relevant or uninteresting material, or the synthesis of important sections of the media file into a summary version of the media file.

At block 506, the crowd source media engine 108 may generate modified media files based on contribution data received from multiple electronic devices, such as the electronic device 104(1)-104(N). The contribution data may be submitted by users who have listen to and/or viewed the media files, and marked sections of the media file to be excluded or sections of the media file to be retained.

At block 508, the crowd source media engine 108 may acquire ratings for the modified media files. In various embodiments, the crowd source media engine 108 may distribute the media files to multiple recipient devices, such that the media files may be evaluated by multiple users. In turn, users of the multiple recipient devices may submit ratings for the media files. The crowd source media engine 108 may generate an overall rating for a modified media file based on one or more ratings that are submitted for the modified media file.

At block 510, the crowd source media engine 108 may calculate a rating for each user that contributed a modified media file. The rating for a user may be calculated based on the overall rating of the modified media file. In instances in which the user has contributed to the generation of other product files, the crowd source media engine 108 may calculate the overall rating based on the ratings of all of the product files generated by the user.

Figure 6:
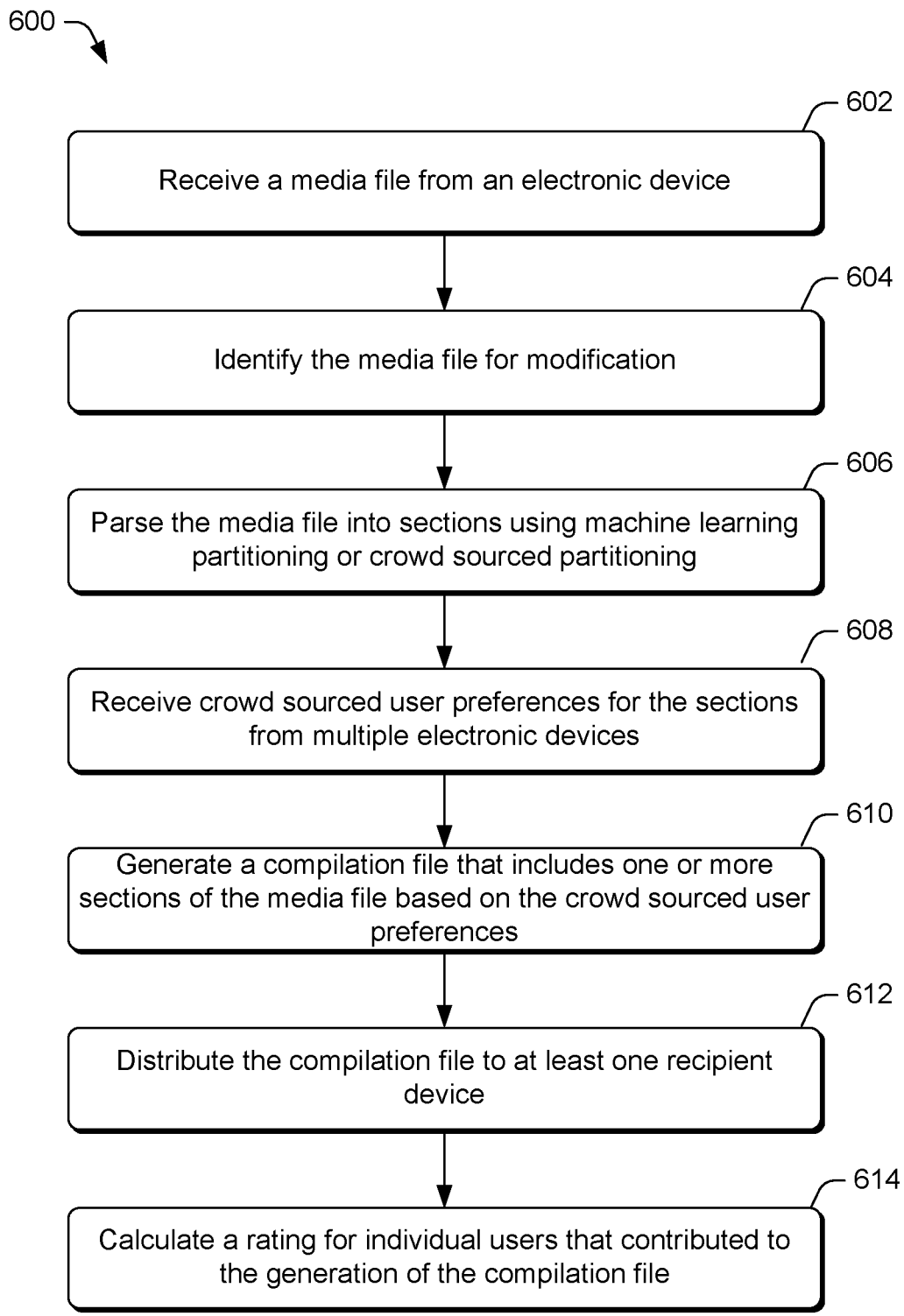
FIG. 6 is a flow diagram of an illustrative process for creating a compilation file that is generated based on crowd sourced ratings of sections in a media file.

FIG. 6 is a flow diagram of an illustrative process 600 for creating a compilation file that is generated based on crowd sourced ratings of sections in a media file. At block 602, the crowd source media engine 108 may receive a media file from an electronic device, such as the electronic device 104(1). In some embodiments, the crowd source media engine 108 may receive the media file in response to broadcasting a request for media files that are related to a topic to multiple electronic devices. The media file may be transmitted to the crowd source media engine 108 via the network 106.

At block 604, the crowd source media engine 108 may identify the media file for modification. The media file may be identified using at least one of metadata embedded in the media file, machine learning based classification, or crowd sourced classification information. In some embodiments, the modification may involve the removal of dead space (e.g., long pauses) from the media file, the removal of non-relevant or uninteresting material, or the synthesis of important sections of the media file into a summary version of the media file.

At block 606, the crowd source media engine 108 parse the media file into sections using machine learning partitioning or crowd sourced partitioning. Machine-learning partitioning may involve division of the media file into section according to breaks in audio continuity (e.g., different speakers or topic) or video continuity (e.g., breaks between shots). Crowd sourced partitioning may involve providing the media file to a plurality of users for analysis, such that the sections of the media file may be ascertained based on user votes on breaks between sections.

At block 608, the crowd source media engine 108 may receive crowd source user preferences for the sections from multiple electronic devices. The user preferences may be in the form of user ratings for the sections or votes for sections to retain or exclude. For example, a user may assign a rating to a section that indicates the perceived quality of the section. Alternatively, the user may vote to retain or exclude a section of the media file from a compilation file.

At block 610, the crowd source media engine 108 may generate a compilation file that includes one or more sections of the media file based on the crowd sourced user preferences for the sections. For example, the crowd source media engine 108 may retain a section in a generated compilation file when the average rating from multiple users for a section exceeds a rating threshold. Alternatively, the crowd source media engine 108 may retain a section when a majority of the votes received from multiple users for a section is in favor of retaining the section in the generated compilation file. In other embodiments, user preferences for a section may be inferred from user behavior towards the section while the user is listening and/or viewing the section.

At block 612, the crowd source media engine 108 may distribute the generated compilation file to one or more recipient devices. The one or more recipient devices may belong to users who desire to view the compilation file. The distribution may be performed in exchange for monetary value.

At block 614, the crowd source media engine 108 may calculate a rating for individual users that contributed to the generation of the compilation file. The rating for a user may be calculated based on the degree that the rating or the vote of the user agreed with the ratings or the votes of the other crowd source participants. In instances in which a user has contributed to the generation of other product files, the crowd source media engine 108 may calculate the overall rating based on the ratings of all of the product files generated by the user.

Figure 7:
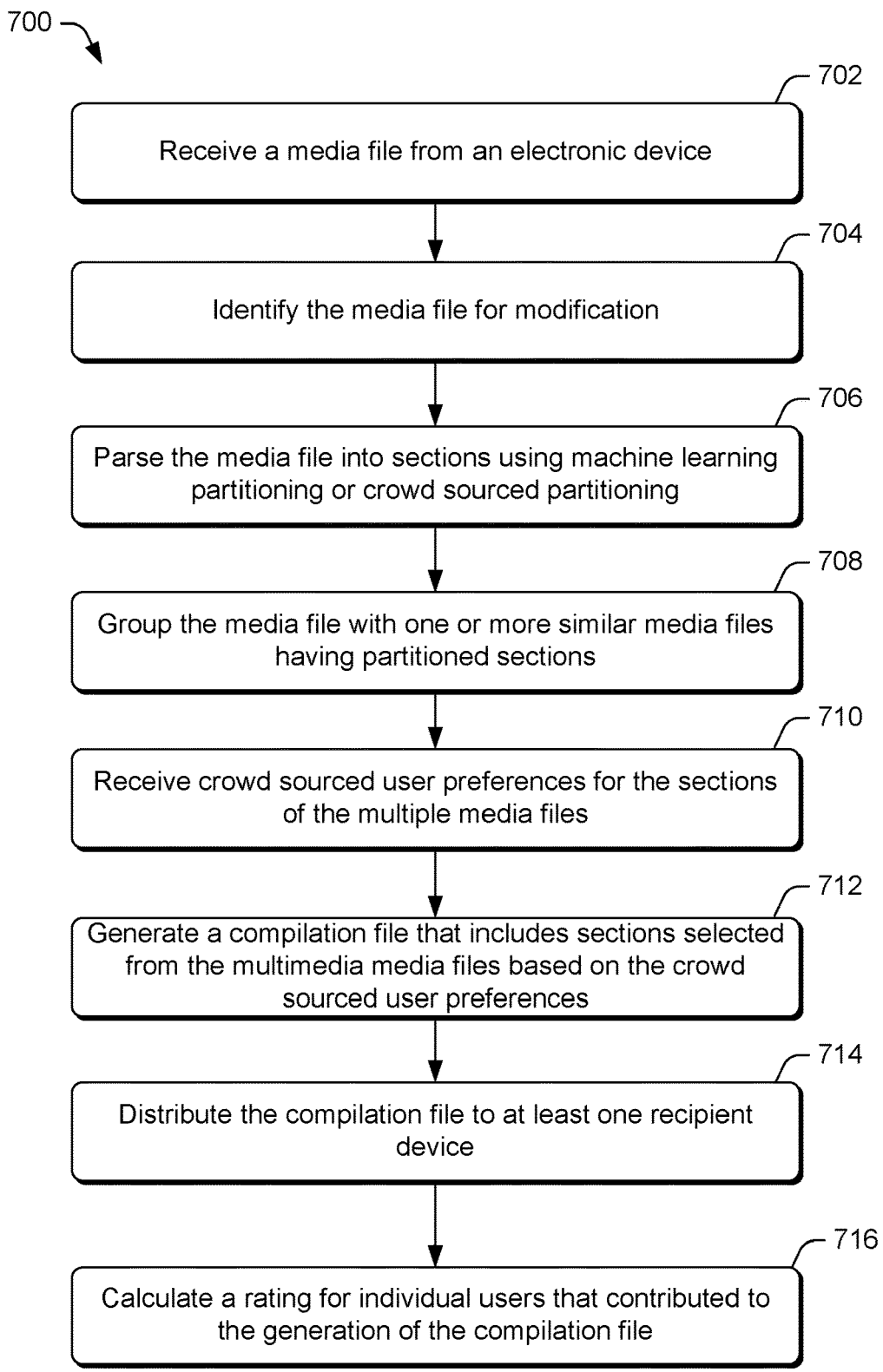
FIG. 7 is a flow diagram of an illustrative process for creating a compilation file that is generated based on crowd source ratings of sections in multiple media files.

FIG. 7 is a flow diagram of an illustrative process 700 for creating a compilation file that is generated based on crowd source ratings of sections in multiple media files. At block 702, the crowd source media engine 108 may receive a media file from an electronic device, such as the electronic device 104(1). In some embodiments, the crowd source media engine 108 may receive the media file in response to broadcasting a request for media files that are related to a topic to multiple electronic devices. The media file may be transmitted to the crowd source media engine 108 via the network 106. At block 704, the crowd source media engine 108 may identify the media file for modification. The media file may be identified using at least one of metadata embedded in the media file, machine learning based classification, or crowd sourced classification information.

At block 706, the crowd source media engine 108 parse the media file into sections using machine learning partitioning or crowd sourced partitioning. Machine-learning partitioning may involve division of the media file into section according to breaks in audio continuity (e.g., different speakers or topic) or video continuity (e.g., breaks between shots). Crowd sourced partitioning may involve provide the media file to a plurality of users for analysis, such that the sections of the media file may be ascertained based on user votes on divisions between sections.

At block 708, the crowd source media engine 108 may group the media file with one or more similar media files that have partitioned sections. In various embodiments, the media file may be grouped with the one or more similar media files based on the identification information of the all the media files. For example, the identification information of all the media files may indicate that the media files are multimedia recordings of a particular presentation that is given by a lecturer.

At block 710, the crowd source media engine 108 may receive crowd sourced user preferences for the sections of the multiple media files from multiple electronic devices. The user preferences may be in the form of user ratings for the sections or votes for sections to retain or exclude. For example, a user may assign a rating to section that indicates the perceived quality of the section. Alternatively, the user may vote to retain or exclude a section of the media file. In this way, the crowd source media engine 108 may select a section from each set of corresponding sections of the multimedia files to include in a compilation file. In other embodiments, user preferences for a section may be inferred from user behavior towards the section while the user is listening and/or viewing the section.

At block 712, the crowd source media engine 108 may generate a compilation file that includes selections selected from the multiple media files. In various embodiments, each section that is included in the compilation file may be a section selected from a set of corresponding sections of the multiple media files. The section may be a section that one or more users have voted to retain or a section of the corresponding sections that received a highest user rating.

At block 714, the crowd source media engine 108 may distribute the generate compilation file to one or more recipient devices. The one or more recipient devices may belong to users who desire to view the compilation file. The distribution may be performed in exchange for monetary value.

At block 716, the crowd source media engine 108 may calculate a rating for individual users that contributed to the generation of the compilation file. The rating for a user may be calculated based on the degree that the rating or the vote of the user agreed with the ratings or the votes of the other crowd source participants. In instances in which a user has contributed to the generation of other product files, the crowd source media engine 108 may calculate the overall rating based on the ratings of all of the product files generated by the user.

Figure 8:
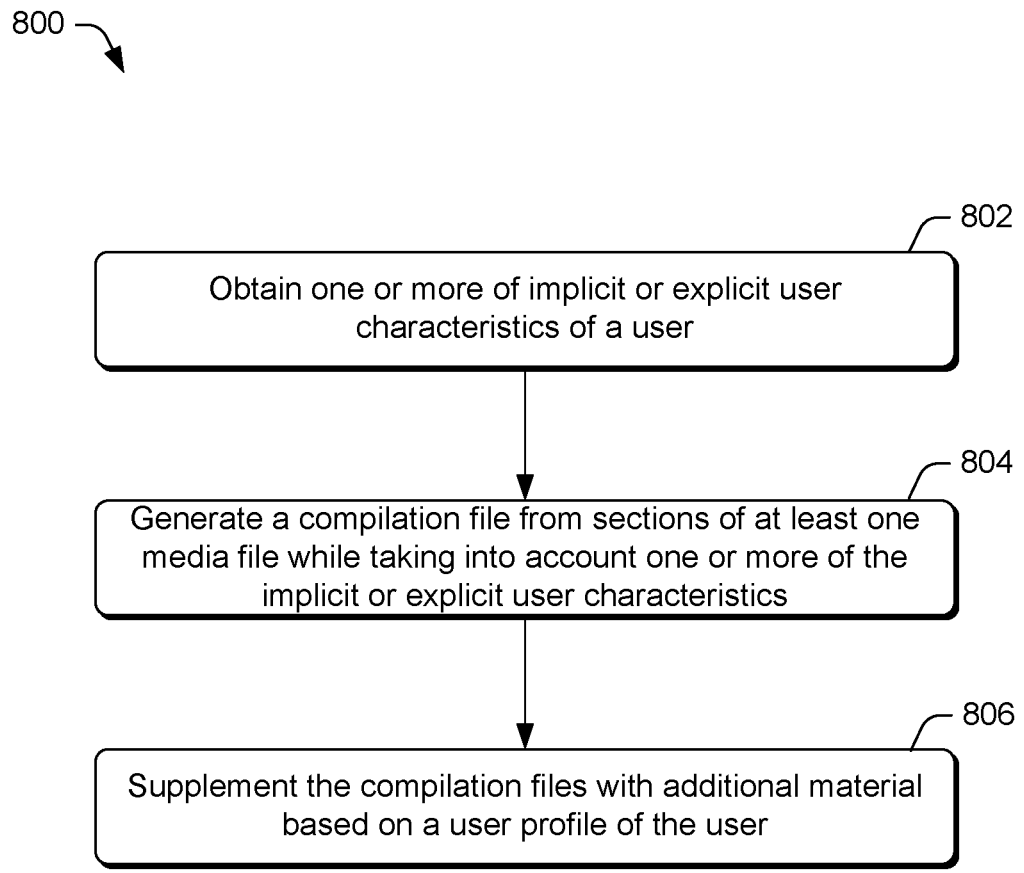
FIG. 8 is a flow diagram of an illustrative process for customizing a compilation file based on user characteristics and supplemental material.

FIG. 8 is a flow diagram of an illustrative process 800 for customizing a compilation file based on user characteristics and supplemental material. The process 800 may further describe the block 610 of the process 600 or the block 712 of the process 700.

At block 802, the crowd source media engine 108 may obtain one or more of implicit user characteristics or explicit user characteristics of a user. The implicit user characteristics may be obtained from the purchase habits of the user at one or more online merchant web sites, social media postings of the user, a prior product file download history of the user, and/or other sources of information. The explicit user characteristics may be information that is specifically provided by the user to the crowd source media engine 108. For example, the user may establish a user profile with the crowd source media engine 108 that indicates the particular language preferences of the user.

At block 804, the crowd source media engine 108 may generate a compilation file from sections of at least one media file while taking into account one or more of the implicit user characteristics or the explicit user characteristics. In various embodiments, the generation of the compilation file may proceed as outlined in the block 610 of the process 600 or the block 712 of the process 700. However, the implicit or the explicit user characteristics may preclude one or more sections from being included in the compilation file. For example, the crowd source media engine 108 may exclude a section having spoken words that are in a particular language or that pertains to a specific topic from the compilation file.

At block 806, the crowd source media engine 108 may supplement the compilation file with additional material based on a user profile of the user. The user profile of the user may be derived from the implicit or explicit information provided by the user, such as demographic information that is obtained based on the purchases made by the user at one or more online merchants. For example, if the crowd source media engine 108 determines from the user profile of a user that the user does not speak a particular language that is used in a section of a media file, the crowd source media engine 108 may insert text translation of the content in the section to the media file. In another example, if the crowd source media engine 108 determines from the user profile of the user that the user is unlikely to be familiar with the content of a compilation file, the crowd source media engine 108 may supplement the compilation file with explanatory material during the generation of the compilation file. In alternative embodiments, the crowd source media engine 108 may also provide supplement information for a modified media files based on a user profile in a similar manner.

Figure 9:
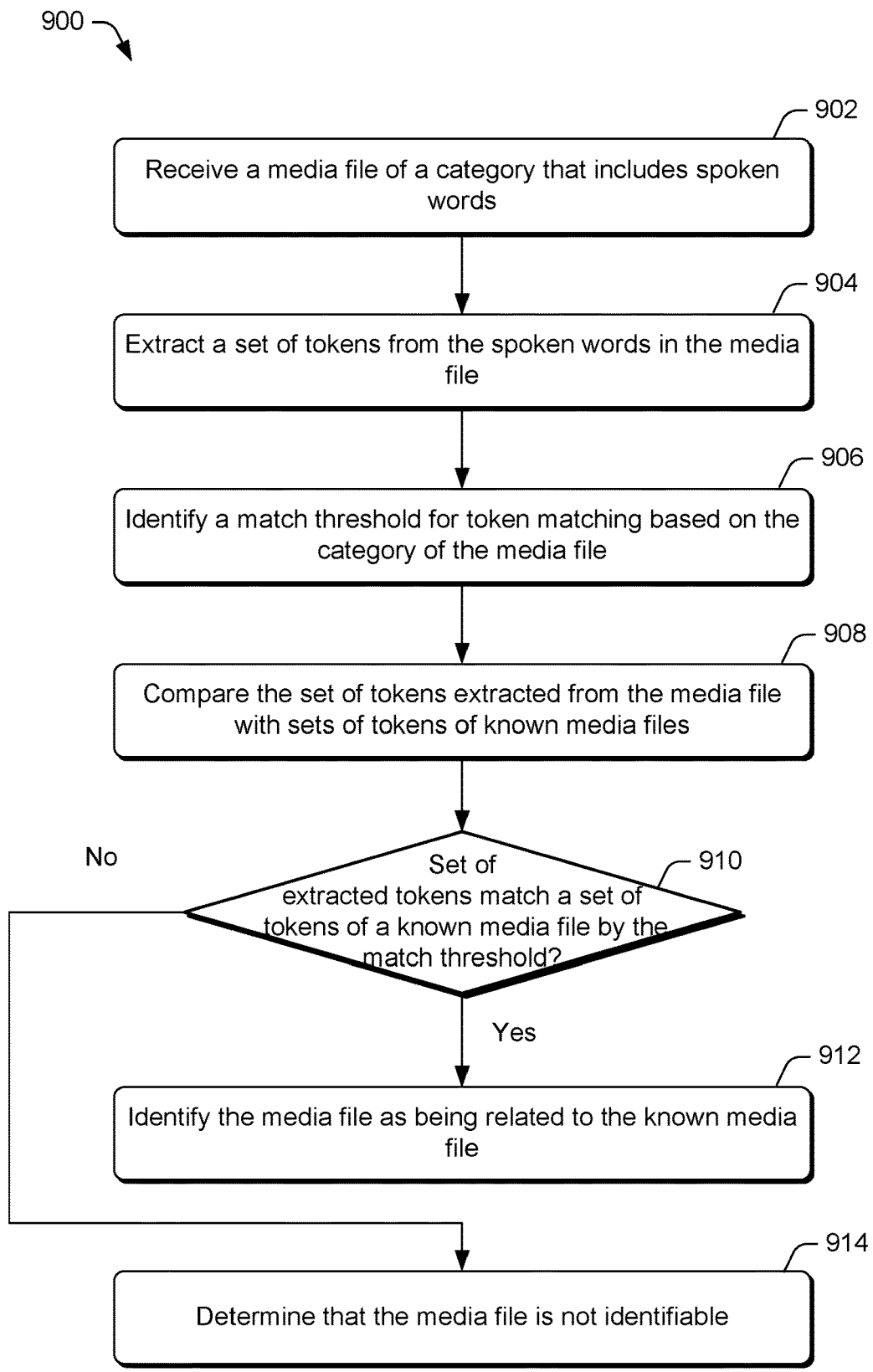
FIG. 9 is a flow diagram of an illustrative process for identifying a media file based on a comparison of the media file to a known media file.

FIG. 9 is a flow diagram of an illustrative process 900 for identifying a media file based on a comparison of the media file to a known media file. At block 902, the crowd source media engine 108 may receive a media file that includes spoken words. The process 900 may further describe the block 708 of the process 700. In various embodiments, the media file may be an audio file or a multimedia file. The media file may be a file of a particular category. For example, the category may be a subject matter category, an importance category, a source category, or so forth.

At block 904, the crowd source media engine 108 may extract a set of tokens from the spoken words in the media file. The extraction may include the use a speech-to-text algorithm to extract words from the audio track of the media file. The extracted words are stored as tokens (e.g., nouns, verbs, adjectives, etc.) that may be further processed by the crowd source media engine 108.

At block 906, the crowd source media engine 108 may identify a match threshold for token matching based on the category of the media file. In various embodiments, the crowd source media engine 108 may use a list of match thresholds for categories that is stored in the data store 226. For example, a media file that belongs to a higher importance category may have a higher match threshold. Conversely, a media file that belongs to a lower importance category may have a lower match threshold.

At block 908, the crowd source media engine 108 may compare the set of tokens that are extracted from the media file with sets of tokens of known media files. At decision block 910, the crowd source media engine 108 may determine whether the set of extracted tokens match a set of tokens of a known media file by a match threshold. If the crowd source media engine 108 determines that if the match meets or exceeds the match threshold ("yes" at decision block 910), the process 900 may proceed to block 912.

At block 912, the crowd source media engine 108 may identify the media file as being related to the known media file. Accordingly, the crowd source media engine 108 may assign the identification information from the known media file to the media file that is identified. However, if the crowd source media engine 108 determines that the match does not meet the match threshold ("no" at decision block 910), the process 900 may proceed to block 914. At block 914, the crowd source media engine 108 may determine that the media file is not identifiable.

Figure 10:
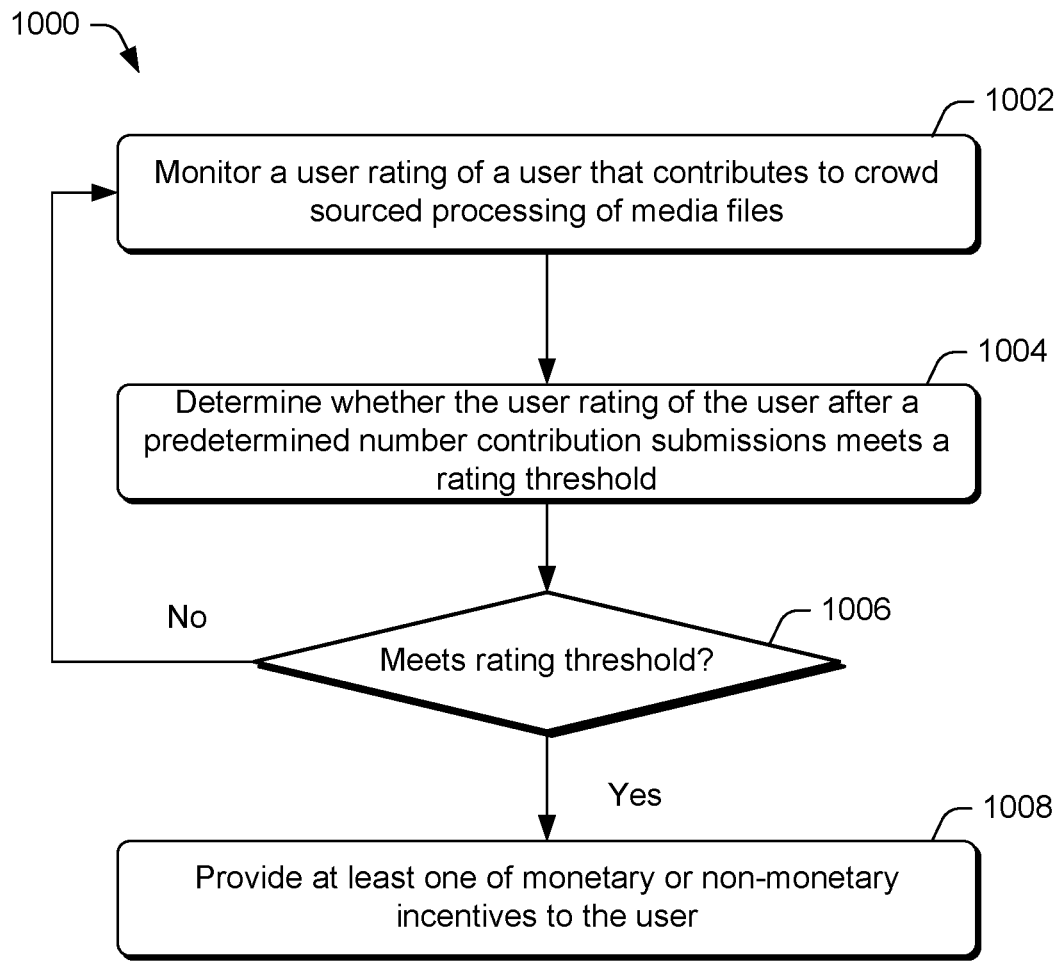
FIG. 10 is a flow diagram of an illustrative process for providing an incentive to a user for contributing to the crowd sourced processing of media files.

FIG. 10 is a flow diagram of an illustrative process 1000 for providing an incentive to a user for contributing to the crowd sourced processing of media files. At block 1002, the crowd source media engine 108 may monitor a user rating of a user that contributes to crowd sourced processing of media files. The contribution of a user may include the generation of a modified media file, contribution of ratings or votes to the generation of a compilation file, contribution of supplemental information, and/or so forth.

At block 1004, the crowd source media engine 108 may determine whether the user rating of a user meets a rating threshold. In various embodiments, the user rating may be a rating that is determined after a predetermined number of contribution submissions. The user rating may be a numerical rating that is based on a fixed scale (e.g., 3 out of 5 stars). Thus, at decision block 1006, if the crowd source media engine 108 determines that the user rating of the user meets a rating threshold ("yes" at decision block 1006), the process 1000 may proceed to block 1008.

At block 1008, the crowd source media engine 108 may provide at least one of monetary or non-monetary incentives to the user. The monetary incentive may be a flat fee monetary award, or a percentage monetary award that is based on proceeds from the sale of a modified media file or a compilation file. Other monetary awards may include a gift certificate, a coupon, store credit, or other tokens that may be used to offset the cost of purchasing goods or services. The non-monetary incentives may be in the form of recognition, such as an increase in rating on a numerical scale or acknowledgment of contribution in creating particular modified media files or compilation files.

However, if the crowd source media engine 108 at decision block 1006 determines that the user rating of the does not meet a rating threshold ("no" at decision block 1006), the process 1000 may proceed to return to block 1002. Upon returning to block 1002, the crowd source media engine 108 may continue to monitor the user rating of a user that contributes to the crowd sourced processing of media files.

Figure 11:
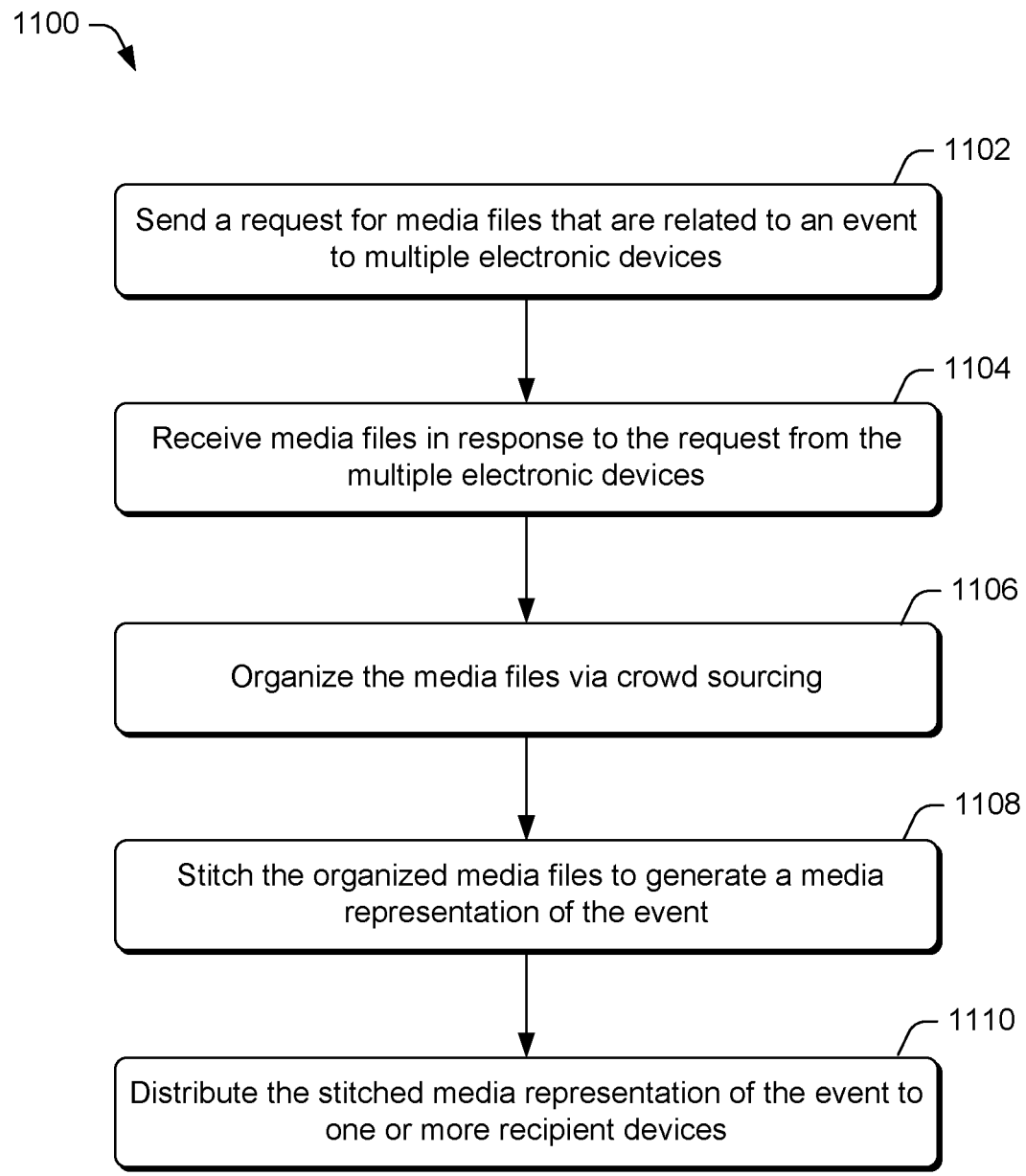
FIG. 11 is a flow diagram of an illustrative process for crowd sourcing media files related an event to create a media presentation for the event.

FIG. 11 is a flow diagram of an illustrative process 1100 for crowd sourcing media files for an event to create a media presentation for the event. At block 1102, the crowd source media engine 108 may request media files that are related to an event. In various embodiments, the request may be broadcasted to multiple electronic devices, such as the multiple devices 104(1)-104(N). For example, the users of the multiple electronic devices may have signed up to receive such a request from the crowd source media engine 108. In another example, the request may be broadcasted to electronic devices that belong to a specific group of users, such as users that belong to a particular organization or users who are employed by a particular company. For example, the event may be a company-specific event that is not open to the general public.

At block 1104, the crowd source media engine 108 may receive media files in response to the request from the multiple electronic devices. The multiple devices may transmit the media files to the crowd source media engine 108 via the network 106. The media files may include audio files, video files, and/or multimedia files.

At block 1106, the crowd source media engine 108 may organize the media files via crowd sourcing. The media files may be taken from different perspective around the event and/or at different times. In various embodiments, the crowd source media engine 108 may solicit temporal tagging and/or geo-tagging of the media files from the users of the multiple electronic devices. The temporal tagging and/or geo-tagging of the media files may serve to provide organization information for the media files. In some embodiments, the crowd source media engine 108 may also solicit users to identify and/or modify offensive content in the received media files. For example, users may mark content that is offensive with metadata flags.

At block 1108, the crowd source media engine 108 may stitch the organized media files to generate a media representation of the event based on the temporal tags and the geo-tags. The stitched media representation may simultaneously display multiple views of action sequences and audio from the event, such that cause and effect between different occurrences in the event may be understood. Further, if there are metadata flags that indicate the presence of offensive content, the crowd source media engine 108 may modify such offensive content. For example, the crowd source media engine 108 may block the offensive content (e.g., visually disturbing images or profanities) in a media file from being presented with silence, tones, or substitute content (a blank frame, a non-offensive image or speech, etc.).

In another example, the crowd source media engine 108 may generate a media representation of the event according to content ratings for sections in the media files that are associated with the event. In such an example, a user may provide a content rating preference, and the compilation module 214 may assemble the media representation of the event from one or more sections of media files that fit the content rating preference. In one instance, the crowd source media engine 108 may generate a media representation that includes sections that are appropriate for viewing by children (e.g., G-rated sections). However, in another instance, the crowd source media engine 108 may generate another product file that includes sections that are appropriate for viewing by both children and adults (e.g., both G-rated and R-rated sections). Accordingly, a user may control the product files that are generated by using user content rating selection preferences. In some embodiments, the media representation, similar to other types of product files, may include at least some metadata or include entirely of metadata that directs an assembly of the media representation from multiple sources of media files.

At block 1110, the crowd source media engine 108 may distribute the stitched media representation of the event to one or more recipient devices, such as the recipient devices 118(1)-118(N). The one or more recipient devices may belong to users who desire to view the media representation. The distribution may be performed in exchange for monetary value.

In summary, the use of crowd sourced processing of media files may yield modified media files and compilation files that provide users with the ability to acquire pertinent content in reduced amounts of time. Such reduction in amount of time may enable users to more efficiently gain knowledge, insight, and/or enjoyment from the media files.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
receiving data indicating user preferences for at least some of a plurality of media files to include in a product file, the user preferences obtained from a plurality of different users and indicating a behavior of the plurality of different users with respect to individual media files of the plurality of media files, the behavior including at least one of a consumption of the individual media files or an interaction with the individual media files;
generating the product file that includes one or more media files selected from the plurality of media files based at least in part on the user preferences, the product file being a condensed file having a first duration that is less than a second duration of the one or more media files; and
providing recognition of at least one user of the plurality of different users that contributed at least some of the user preferences used for generation of the product file.

2. The method as recited in claim 1, further comprising soliciting ratings from the plurality of different users via a user interface that provides access to at least some of the plurality of media files, wherein the ratings indicate the user preferences.

3. The method as recited in claim 1, further comprising determining an order of the one of more media files that are included in the product file based at least in part on at least one of temporal information or location information associated with at least one media files of the one or more media files.

4. The method as recited in claim 1, further comprising modifying at least one media file of the one or more media files prior to the generating the product file to shorten a duration of the at least one media file.

5. The method as recited in claim 1, further comprising selecting the plurality of media files based at least in part on an event that is common among the plurality of media files.

6. The method as recited in claim 1, further comprising generating the plurality of media files by segmenting a master media file, and wherein the product file is a summary version of the master media file.

7. The method as recited in claim 6, further comprising employing an image recognition algorithm to determine bounds of segments of the master media file, wherein the segmenting is based at least in part on the bounds of the segments.

8. A method comprising:
receiving, from multiple different electronic devices, multiple media files that are associated with an event, at least two of the multiple media files having different visual perspectives of the event;
receiving at least one of temporal data or location data associated with individual media files of the multiple media files;
organizing the multiple media files by at least one of:
temporally arranging the multiple media files based at least in part on the temporal data associated with the individual media files, or
spatially arranging the multiple media files based at least in part on the location data associated with the individual media files;
at least one of:
receiving data indicating user preferences for the individual media files, the user preferences obtained from the multiple different electronic devices and indicating a behavior of a plurality of different users with respect to the individual media files, the behavior including at least one of a consumption of the individual media files or an interaction with the individual media files; or
acquiring ratings for the individual media files, the ratings being based at least in part on inputs, received from the plurality of different users, indicating one or more first portions of the individual media files that are to be retained and one or more second portions of the individual media files that are to be removed; and
combining, based at least in part on at least one of the user preferences or the ratings, the multiple media files to generate a product file to represent the event, the product file being a condensed file having a first duration that is less than a second duration of the multiple media files.

9. The method as recited in claim 8, further comprising:
receiving user input from the plurality of different users that rate at least the individual media files; and
selecting the multiple media files based at least in part on the user input.

10. The method as recited in claim 8, further comprising removing a media file from the multiple media files based at least in part on the media file including at least one of offensive material or dead space.

11. The method as recited in claim 8, further comprising:
determining a location associated with the event; and
selecting the individual media files based at least in part on location data associated with the individual media files that corresponds to the location associated with the event.

12. The method as recited in claim 8, further comprising selecting the individual media files based at least in part on user playback interaction with the individual media files.

13. The method as recited in claim 8, further comprising soliciting the ratings from the plurality of different users via a user interface that provides access to the individual media files.

14. The method as recited in claim 8, further comprising selecting the individual media files based at least in part on an image quality associated with the individual media files.

15. A system, comprising:
one or more processors; and
memory storing instructions that are executable by the one or more processors to perform actions comprising:
receiving a media file;
acquiring ratings for the media file, the ratings being based at least in part on inputs, received from a plurality of users, indicating one or more first portions of the media file that are to be retained and one or more second portions of the media file that are to be removed;
creating a product file by combining the media file with at least one other media file based at least in part on the ratings, the product file being a condensed file having a first duration that is less than a second duration of the media file and the at least one other media file; and
distributing the product file for access by one or more user devices.

16. The system as recited in claim 15, wherein the actions further comprise receiving contribution data from a user device, the contribution data indicating a different media file to exclude from the product file.

17. The system as recited in claim 16, wherein the actions further comprising receiving user input from a plurality of users to validate at least some of the contribution data prior to excluding the different media file from the product file.

18. The system as recited in claim 15, wherein the actions further comprise removing, based at least in part on the ratings, at least a portion of the media file prior to creating the product file, the portion identified at least in part by an image recognition algorithm.

19. The system as recited in claim 15, wherein the actions further comprise including at least one of a language translation or an explanation to the product file.

20. The system as recited in claim 15, wherein the media file includes content associated with an event, and wherein the actions further comprise selecting the at least one other media file based at least in part on a depiction of the event by the at least one other media file.

\* \* \* \* \*